US011832125B2

United States Patent
Hong et al.

(10) Patent No.: US 11,832,125 B2
(45) Date of Patent: Nov. 28, 2023

(54) METHOD FOR TRANSMITTING BUFFER STATUS REPORT OF TERMINAL IN SMALL CELL ENVIRONMENT AND DEVICE THEREFOR

(71) Applicant: KT CORPORATION, Gyeonggi-do (KR)

(72) Inventors: Sung-pyo Hong, Seoul (KR); KyungJun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 441 days.

(21) Appl. No.: 14/770,607

(22) PCT Filed: Feb. 11, 2014

(86) PCT No.: PCT/KR2014/001124
§ 371 (c)(1),
(2) Date: Aug. 26, 2015

(87) PCT Pub. No.: WO2014/133271
PCT Pub. Date: Sep. 4, 2014

(65) Prior Publication Data
US 2016/0029245 A1 Jan. 28, 2016

(30) Foreign Application Priority Data

Feb. 27, 2013 (KR) .................. 10-2013-0021563
Oct. 29, 2013 (KR) .................. 10-2013-0129039
Feb. 11, 2014 (KR) .................. 10-2014-0015508

(51) Int. Cl.
*H04W 28/02* (2009.01)
*H04W 76/11* (2018.01)
(Continued)

(52) U.S. Cl.
CPC ... *H04W 28/0278* (2013.01); *H04W 28/0252* (2013.01); *H04W 76/11* (2018.02);
(Continued)

(58) Field of Classification Search
CPC ........... H04W 28/0278; H04W 76/025; H04W 28/0252; H04W 76/021; H04W 80/02;
(Continued)

(56) References Cited

U.S. PATENT DOCUMENTS 8,913,518 B2 * 12/2014 Heo .............. H04W 52/54
370/252
2010/0098011 A1 4/2010 Pelletier et al.
(Continued)

FOREIGN PATENT DOCUMENTS

EP 2398274 A1 12/2011

OTHER PUBLICATIONS

U.S. Appl. No. 61/646,888, "MBMS Nationwide Services", Sep. 2012.*
(Continued)

*Primary Examiner* — Thinh D Tran
(74) *Attorney, Agent, or Firm* — IP Legal Services, LLC

(57) ABSTRACT

The present disclosure relates a method of transmitting a buffer status report by a terminal. The method may include i) receiving an RRC reconfiguration message including identification information, ii) identifying logic channels associated with the first base station and logic channels associated with the second base station, iii) triggering the buffer status report by identifying buffer statuses of the identified logic channels associated with the first base station and the second base station, and transmitting the buffer status reports to the first base station and the second base station.

16 Claims, 15 Drawing Sheets

(51) Int. Cl.
*H04W 76/15* (2018.01)
*H04W 88/08* (2009.01)
*H04W 88/02* (2009.01)
*H04W 80/02* (2009.01)

(52) U.S. Cl.
CPC ............ *H04W 76/15* (2018.02); *H04W 80/02* (2013.01); *H04W 88/02* (2013.01); *H04W 88/08* (2013.01)

(58) Field of Classification Search
CPC ..... H04W 88/08; H04W 88/02; H04W 76/11; H04W 76/15; H04W 24/10
See application file for complete search history.

(56) References Cited

U.S. PATENT DOCUMENTS

| | | | |
|---|---|---|---|
| 2010/0278105 A1 | 11/2010 | Diachina et al. | |
| 2011/0243106 A1* | 10/2011 | Hsu ...................... | H04L 5/0098 370/336 |
| 2011/0249635 A1* | 10/2011 | Chen ................. | H04W 74/0833 370/329 |
| 2011/0261747 A1* | 10/2011 | Wang .................... | H04W 40/22 370/315 |
| 2011/0310800 A1 | 12/2011 | Lin et al. | |
| 2011/0310937 A1 | 12/2011 | Lin et al. | |
| 2012/0069805 A1* | 3/2012 | Feuersanger ..... | H04W 72/1268 370/329 |
| 2012/0095437 A1 | 4/2012 | Hemmerling | |
| 2012/0140743 A1* | 6/2012 | Pelletier ............ | H04W 72/0453 370/335 |
| 2012/0281666 A1 | 11/2012 | Diachina et al. | |
| 2012/0294213 A1* | 11/2012 | Chen .................... | H04L 5/0098 370/329 |
| 2013/0003583 A1* | 1/2013 | Landstrom ........... | H04B 7/0452 370/252 |
| 2013/0088979 A1* | 4/2013 | Bi ......................... | H04B 7/024 370/252 |
| 2013/0208688 A1 | 8/2013 | Diachina et al. | |
| 2014/0010192 A1* | 1/2014 | Chang .................... | H04L 5/001 370/329 |
| 2014/0092785 A1* | 4/2014 | Song ........................ | H04L 1/00 370/280 |
| 2014/0185467 A1* | 7/2014 | Heo ....................... | H04W 52/54 370/252 |
| 2015/0043547 A1 | 2/2015 | Pelletier et al. | |
| 2015/0117287 A1* | 4/2015 | Kim .................. | H04W 52/0216 370/311 |
| 2015/0195851 A1 | 7/2015 | Diachina et al. | |

OTHER PUBLICATIONS

U.S. Appl. No. 61/644,645, "Method and Apparatus for Inter-ENB CA", May 2012.*
U.S. Appl. No. 61/649,910, "RAT/PLMN Selection in Network Overload", Aug. 2012.*
Kim et al., "Method and Apparatus for Transceiving Data Using Plurality of Carriers in Mobile Communication System", Samsung Electronics Co, PCT/KR2013/004109, Nov. 14, 2013.*
Huawei et al., "Feasible scenarios and benefits of dual connectivity in small cell deployment", R2-130225, 3GPP TSG-RAN WG2 Meeting #81, St. Julian's, Malta, Jan. 28-Feb. 1, 2013. pp. 1-9.
NTT Docomo, Inc., "Discussion on U-plane architecture for dual connectivity", R2-130324, 3GPP TSG-RAN WG2 #81, St. Julian's, Malta, Jan. 28-Feb. 1, 2013, pp. 1-6.
3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, pp. 1-340.
LG Electronics, Inc., "Connectivity Models for Small Cell Enhancement", 3GPP TSG-RAN WG2 #81 St. Julian's, Malta, Jan. 28-Feb. 1, 2013, R2-130314, pp. 1-8.
3GPP, "3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.1.0, Dec. 2012, pp. 1-57.

* cited by examiner

BACKHAUL LINK IN CLUSTER

FIG.9
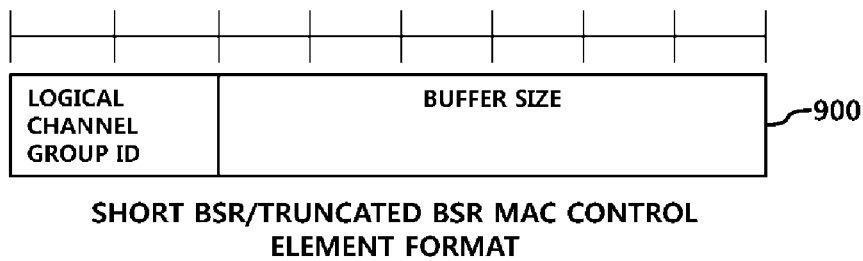
SHORT BSR/TRUNCATED BSR MAC CONTROL
ELEMENT FORMAT
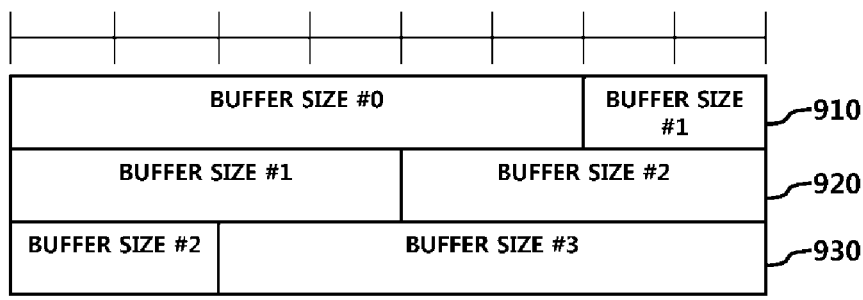
LONG BSR MAC CONTROL ELEMENT FORMAT

METHOD FOR TRANSMITTING BUFFER STATUS REPORT OF TERMINAL IN SMALL CELL ENVIRONMENT AND DEVICE THEREFOR

CROSS REFERENCE TO RELATED APPLICATIONS

This application is a National Stage Patent Application of PCT International Patent Application No. PCT/KR2014/001124 (filed on Feb. 11, 2014) under 35 U.S.C. § 371, which claims priority to Korean Patent Application Nos. 10-2013-0021563 (filed on Feb. 27, 2013), 10-2013-0129039 (filed on Oct. 29, 2013), and 10-2014-0015508 (filed on Feb. 11, 2014), the teachings of which are incorporated herein in their entireties by reference.

TECHNICAL FIELD

The present disclosure relates to a wireless communication system, and more particularly, to a buffer status reporting technology for a User Equipment (UE) to transmit uplink data using a plurality of carriers between Base Stations (BSs), in a small cell environment where the UE has dual connectivity with different BSs.

BACKGROUND ART

Due to advances in communication systems, various wireless terminals have been introduced to consumers, such as companies and individuals.

A current mobile communication system employs technologies related to $3^{rd}$ generation partnership project (3GPP), for example, Long Term Evolution (LTE), LTE-Advanced (LTE-A), and the like. Such a mobile communication system requires a high speed and large capacity communication system capable of transmitting and receiving various types of data, such as image data, wireless data, and the like, beyond providing a voice service.

Accordingly, there is a demand for a technology that extends the capacity of a User Equipment (UE) by utilizing a small cell for the high speed and capacity communication system.

A Buffer Status Report (BSR) reports, from a UE, how much uplink data to be transmitted to a BS in a MAC layer, exists in a buffer.

In this instance, there is a desire for a method for enabling a UE using radio resources provided by a macro cell base station and a small cell base station to distinguish a buffer status report (BSR) for the macro cell BS and a BSR for the small cell BS and to transmit the distinguished BSR to the macro cell BS or the small cell BS.

DETAILED DESCRIPTION OF THE INVENTION

Technical Problem

The present disclosure is to provide a method and an apparatus for a User Equipment (UE) to identify a buffer status report of a data radio bearer associated with each Base Station (BS) and to transmit the identified buffer status report to a corresponding BS.

Technical Solution

According to embodiments of the present disclosure, a method may be provided for transmitting a buffer status report by a User Equipment (UE) that configures dual connectivity with a first Base Station (BS) and a second BS, which are connected through a non-ideal backhaul, to transfer a buffer status report. The method may include: receiving, from the first BS, an RRC reconfiguration message including identification information that distinguishes a radio bearer to be transferred through the first BS or Component Carriers (CCs) of the first BS and a radio bearer to be transferred through the second BS or CCs of the second BS; distinguishing logical channels to be mapped and transferred through the first BS or the CCs of the first BS, and logical channels to be mapped and transferred through the second BS or the CCs of the second BS in a MAC layer; triggering a buffer status report by distinguishing a buffer status of the logical channels or a logical channel group to be mapped and transferred through the first BS or the CCs of the first BS, and a buffer status of logical channels or a logical channel group to be mapped and transferred through the second BS or the CCs of the second BS; and transmitting, to the first BS, a buffer status report associated with the logical channels or the logical group that is mapped and transferred through the first BS or the CCs of the first BS, and transmitting, to the second BS, a buffer status report associated with the logical channels or the logical group that is mapped and transferred through the second BS or the CCs of the second BS.

According to embodiments of the present disclosure, a method may be provided for a first BS to control buffer status reporting of a UE. The method may include: generating identification information for distinguishing a radio bearer to be transferred through the first BS or CCs of the first BS and a radio bearer to be transferred through a second BS or CCs of the second BS; transmitting an RRC reconfiguration message including the identification information to the UE; and receiving a buffer status report associated with logical channels or a logical channel group to be mapped and transferred through the first BS or the CCs of the first BS, which is distinguished from a buffer status report associated with logical channels or a logical channel group to be mapped or transferred through the second BS or the CCs of the second BS.

According to embodiments of the present disclosure, a UE may be provided for transmitting a buffer status report. Such a UE configures dual connectivity with a first BS and a second BS, which are connected through a non-ideal backhaul. The UE may include a receiving unit, a controller, and a transmitting unit. The receiving unit may be configured to receive, from the first BS, an RRC reconfiguration message including identification information for distinguishing a radio bearer to be transferred through the first BS or CCs of the first BS, and a radio bearer to be transferred through the second BS or CCs of the second BS. The controller may be configured to distinguish logical channels to be mapped and transferred through the first BS or the CCs of the first BS and logical channels to be mapped and transferred through the second BS or the CCs of the second BS, in a MAC layer, and to trigger a buffer status report by distinguishing a buffer status of the logical channels or a logical channel group to be mapped and transferred through the first BS or the CCs of the first BS, and a buffer status of the logical channels or a logical channel group to be mapped and transferred through the second BS or the CCs of the second BS. The transmitting unit may be configured to transmit, to the first BS, a buffer status report associated with the logical channels or the logical channel group to be mapped or transferred through the first BS or the CCs of the first BS, and to transmit, to the second BS, a buffer status report associated with the logical channels or the logical channel group to be mapped or transferred through the second BS or the CCs of the second BS.

According to embodiments of the present disclosure, a first Base Station (BS) may be provided for controlling buffer status reporting of a UE. The BS may include a controller, a transmitting unit, and a receiving unit. The controller may be configured to generate identification information for distinguishing a radio bearer to be transferred through the first BS or Component Carriers (CCs) of the first BS and a radio bearer to be transferred through a second BS or CCs of the second BS. The transmitting unit may be configured to transmit, to the UE, an RRC reconfiguration message including the identification information. The receiving unit may be configured to receive a buffer status report associated with logical channels or a logical channel group to be mapped and transferred through the first BS or the CCs of the first BS, which is distinguished from a buffer status report associated with logical channels or a logical channel group to be mapped and transferred through the second BS or the CCs of the second BS.

Advantageous Effects

According to embodiments of the present disclosure, a User Equipment (UE) identifies a buffer status report of a data radio bearer associated with each Base Station (BS) and transmits the identified buffer status report to a corresponding BS.

BRIEF DESCRIPTION OF THE DRAWINGS

FIG. 9 is a diagram illustrating a buffer status report MAC control element format to which at least one embodiment is applied;

MODE FOR CARRYING OUT THE INVENTION

Figure 1:
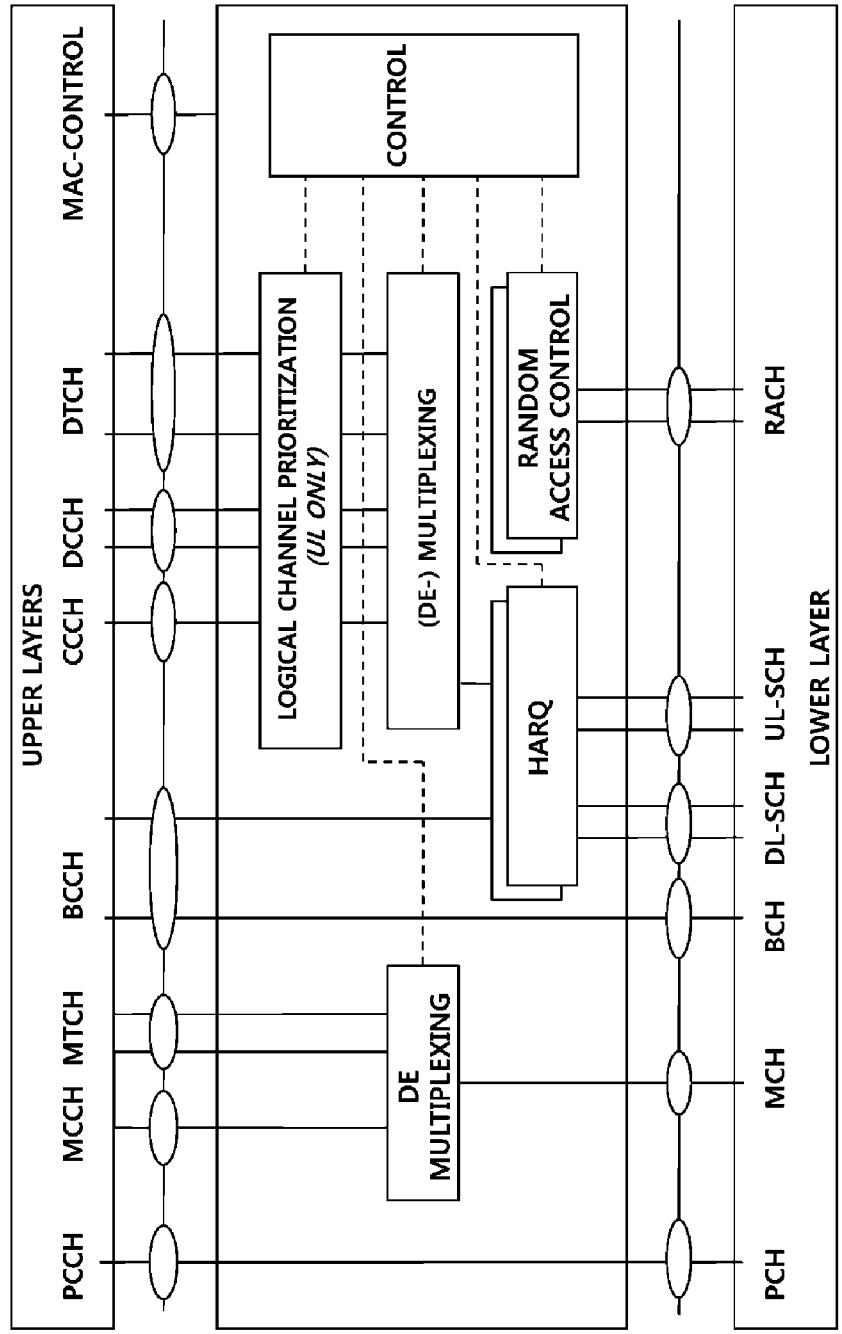
FIG. 1 is a diagram illustrating configuration of a medium access control MAC of a typical UE.

Hereinafter, some embodiments of the present disclosure will be described with reference to the exemplary drawings. In attaching reference signs to elements in each drawing, it should be noted that the same elements will be designated by the same reference numerals although they are shown in different drawings. Further, in the following description of the present disclosure, a detailed description of known functions and configurations incorporated herein will be omitted when it may make the subject matter of the present invention rather unclear.

In the present disclosure, the wireless communication system may be widely deployed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in WCDMA (wideband code division multiple access), LTE (long term evolution), HSPA (high speed packet access), and the like, and an MS (Mobile station), a UT (User Terminal), an SS (Subscriber Station), a wireless device, and the like in GSM (global system for mobile communications).

A base station or a cell may generally refer to a station where communication with a User Equipment (UE) is performed. The base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

In the specifications, the user equipment and the base station are used as two inclusive transceiving subjects to embody the technology and technical concepts described in the specifications. The user equipment and the base station may not be limited to a predetermined term or word. The user equipment and the base station are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced. The embodiment may be applicable to resource allocation in a synchronous wireless communication scheme that is advanced through CDMA and CDMA-2000, to be ultra mobile broadband (UMB). The present embodiments may not be limited to a specific wireless communication field. The present embodiments may include all technical fields to which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-Advanced, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), and the like, and may be configured as a data channel, such as a PDSCH (Physical Downlink Shared CHannel), a PUSCH (Physical Uplink Shared CHannel), and the like, so as to transmit data.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (COMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macro cell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

An eNB executes downlink transmission to UEs. The eNB 110 may transmit a Physical Downlink Shared Channel (PDSCH) which is a primary physical channel for unicast transmission. The eNB 110 may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

In this instance, a first UE (UE1) transmits an uplink signal to an eNB, and a second UE transmits an uplink signal to an RRH, as in the description provided hereinafter with reference to the drawings.

A small cell uses a low-power node. The small cell is considered as a means to cope with an explosive increase of mobile traffic. The low power node indicates a node that uses a lower transmission power (Tx) than a general macro node.

A Carrier Aggregation (CA) technology before 3GPP Release 11 configures a small cell using a low power Remote Radio Head (RRH), which are antennas geographically distributed within a macro cell coverage.

However, to apply the CA technology, the macro cell and the RRH cell are configured to be scheduled under a control of a single BS. To this end, an ideal backhaul needs to be established between a macro cell BS and an RRH node. The ideal backhaul indicates a backhaul that shows a significantly high throughput and a significantly low delay, like a dedicated point-to-point connection that uses an optical fiber and Line Of Sight (LOS) microwave. Unlike the above, a backhaul that shows a relatively low throughput and a relatively high delay, such as xDSL (Digital Subscriber Line) and Non-LOS microwave, is referred to as a non-ideal backhaul.

A plurality of serving cells may be aggregated through the CA technology, so as to provide services to a User Equipment (UE). That is, a plurality of cells may be configured with respect to a UE in a Radio Resource Control (RRC) connected-state, and when an ideal backhaul is established between the macro cell nod and the RRH, the macro cell and the RRH cell are configured as serving cells and provide services to the UE.

When the above described CA technology is configured, the UE may have only a single RRC connection with a network.

In RRC connection establishment/re-establishment/handover, a single serving cell may provide NAS mobility information (for example, Tracking Area Identity (TAI). In RRC connection re-establishment/handover, a single serving cell provides a security input. The cell is referred to as a primary cell (PCell). The PCell may be changed through only a handover procedure.

FIG. 1 is a diagram illustrating medium access control (MAC) configuration of a typical UE.

Referring to FIG. 1, in a MAC layer of a UE, a single MAC entity may connect an upper layer and a lower layer in order to transmit data.

Hereinafter, MAC configuration and function in Carrier Aggregation (CA) technology will be described in detail.

Depending on capabilities of UEs, secondary cells (SCell) may be configured as serving cells together with a primary cell (PCell).

When a single BS processes a PCell and SCells, such a single BS may have different carriers (DL/UL PCC: Downlink/Uplink Primary Component Carrier, DL/UL SCC: Downlink/Uplink Secondary Component Carrier) in a physical layer. However, such different carriers may affect only a Medium Access Control (MAC) layer. The different carriers may not affect RLC/PDCP layer before the CA technology is introduced. That is, the CA operation may not be identified in the RLC/PDCP layer.

The MAC layer may perform mapping between logical channels and transport channels. In addition, the MAC layer may multiplex MAC Service Data Units (SDUs) to Transport Blocks (TBs) that are transferred from one or more different logical channels to physical layer transport channels. In addition, the MAC layer may de-multiplex Transport Blocks (TBs) to MAC Service Data Units (SDUs) where the Transport Blocks (TBs) are transferred from one or more different logical channels to physical layer transport channels. In addition, the MAC layer may perform logical channel prioritization, error correction through Hybrid automatic repeat request, or the like. All uplink logical channels of the UE may be multiplexed and mapped to transport channels (UL-SCHs) in a single MAC entity, as illustrated in FIG. 1. That is, the uplink logical channels may be multiplexed and mapped to the transport channels without distinguishing transport channels for each logical channel.

When the UE is configured with one or more secondary cells (SCells), a plurality of Downlink Shred Channels (DL-SCHs) may exist. Also, a plurality of Uplink Shared Channels (UL-SCHs) and a Random Access Channel (RACH) may exist.

That is, the UE may have a single DL-SCH and a UL-SCH with respect to a PCell, and the UE may have a single DL-SCH, no or one UL-SCH, and no or one RACH with respect to each secondary cell (SCell).

A buffer status report procedure is a procedure for providing, to a serving cell BS, information on an amount of available data for transmission in UE Uplink (UL) buffers. The Buffer Status Report (BSR) may be triggered when the following event occurs.

It is available to use Uplink data for a single logical channel included in a single Logical Channel Group (LCG) in order for transmission in a Radio Link Control (RLC) entity or a Packet Data Convergence Protocol (PDCP) entity. Also, the available data may be unavailable with respect to a logical channel included in the logical channel group or any of logical channels included in a single logical channel group, which has a priority that is higher than the logical channels associated with the available data. A buffer status report of this case is referred to as a "Regular BSR."

A buffer status report is referred to as a "Padding BSR" when uplink resources are allocated and the number of padding bits is greater than or equal to a size obtained by adding a MAC control element and a sub-header thereof.

A buffer status report is referred to as a "Regular BSR" when a retransmission buffer status report timer (retxBSR-Timer) expires and a UE has available data for transmission associated with any of the logical channels included in a logical channel group.

A buffer status report is referred to as a "Periodic BSR" when a periodic buffer status report timer (periodicBSR-Timer) expires.

A single MAC Protocol Data Unit (PDU) may include at most a single MAC buffer status report (BSR) control element.

A UE should transmit at most a single Regular/periodic BSR within a single Transmission Time Interval (TTI). When the UE is requested to transmit a plurality of MAC PDUs within a single TTI, the UE may include a padding BSR in any one of MAC PDCs that do not include the Regular/Periodic BSR.

All BSRs transmitted within a single TTI indicate a buffer status after all MAC PDUs are generated, with respect to the TTI. Each logical channel group should report at most a single buffer status value for each TTI. Also, the value needs to be reported in all buffer status reports (BSR) that report a buffer status associated with the logical channel group.

As described above, in the typical mobile communication network, the CA technology has been used based on a single BS. To use a small cell, a macro cell and a small cell need to be scheduled under the control of a single BS. To this end, an ideal backhaul needs to be established between a macro cell node and a small cell node. Therefore, the CA technology may not be used when the macro cell and the small cell are configured through different BSs through a non-ideal backhaul. Also, the typical CA technology may not distinguish Component Carriers that a UE transfers for each logical channel, and the typical CA technology may have a drawback in that a buffer status is not reported to each BS.

To overcome the above described drawbacks, the present disclosure provides a medium access control method and a buffer status report method, for transferring user plane data traffic through a small cell under the control of a macro cell (or through the cooperation between a macro cell and a small cell) in an environment where the macro cell and the small cell are configured by different BSs through a backhaul in a mobile communication network.

Figure 2:
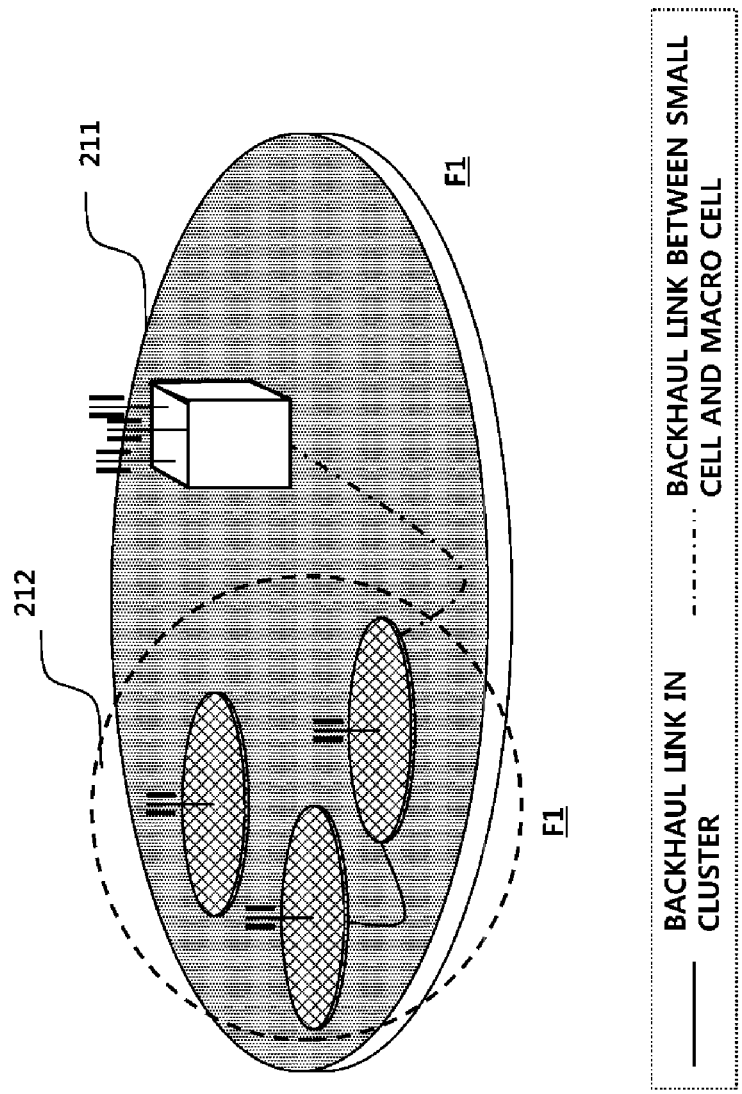
FIG. 2 is a diagram illustrating an example of a network configuration scenario to which at least one embodiment is applied.

FIG. 2 is a diagram illustrating an example of a network configuration scenario to which at least one embodiment is applied.

As described in FIG. 2, a macro cell 211 and small cells 212 have an identical carrier frequency F1, and a macro cell BS and a small cell BS are connected through a non-ideal backhaul. Small cells may be overlaid in a macro cell coverage. Such network configuration scenario may be an outdoor small cell environment and a small cell cluster 212.

Figure 3:
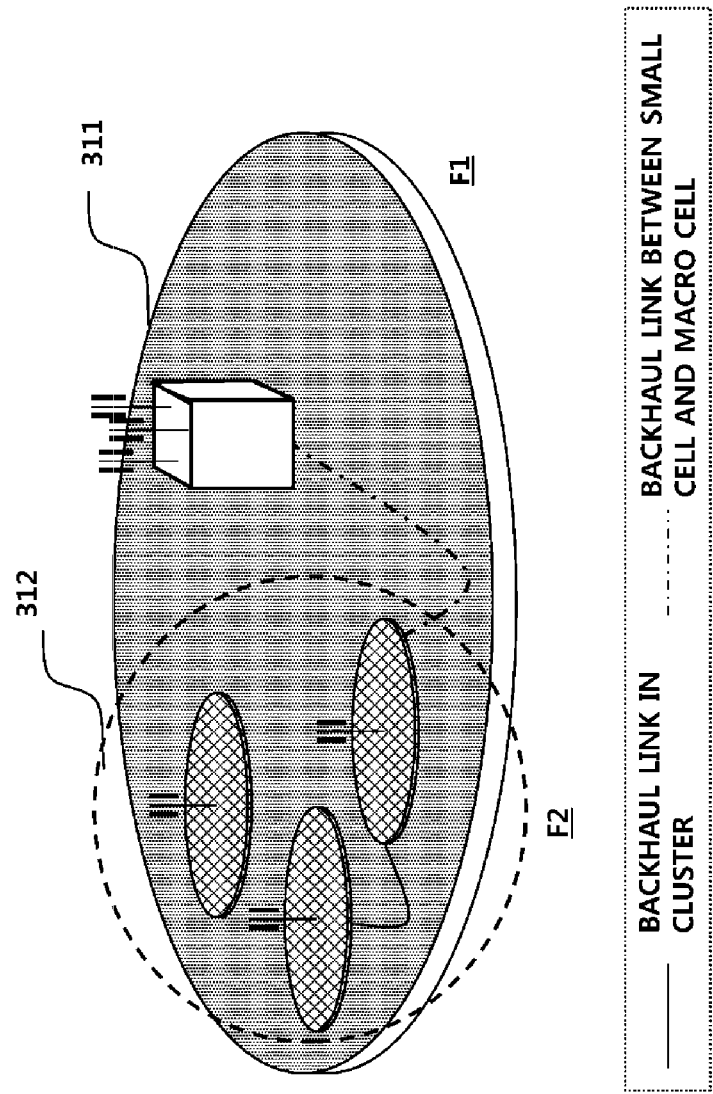
FIG. 3 is a diagram illustrating another example of a network configuration scenario to which at least one embodiment is applied.

FIG. 3 is a diagram illustrating another example of a network configuration scenario to which at least one embodiment is applied.

As illustrated in FIG. 3, a macro cell 311 and small cells 312 have different carrier frequencies (F1 and F2), and a macro cell BS and a small cell BS are connected through a non-ideal backhaul. Small cells 312 may be overlaid in a macro cell coverage. Such network configuration scenario may be an outdoor small cell environment or an indoor small cell environment and a small cell cluster.

Figure 4:
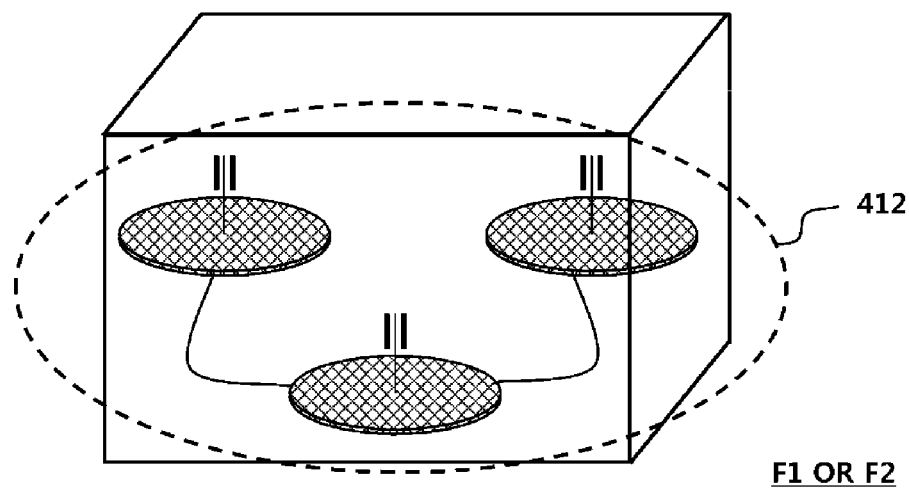
FIG. 4 is a diagram illustrating another example of a network configuration scenario to which at least one embodiment is applied.

FIG. 4 is a diagram illustrating another example of a network configuration scenario to which at least one embodiment is applied.

As illustrated in FIG. 4, a network environment includes only small cells 412 that have one or more carrier frequencies (F1 or F2). Small cell BSs are connected through a non-ideal backhaul. Such network configuration scenario may be an indoor small cell environment and a small cell cluster.

That is, as described in FIG. 2 and FIG. 3, a UE may perform communication through dual connectivity with a macro cell and a small cell. Also, the UE may perform communication through dual connectivity with a plurality of small cells, as illustrated in FIG. 4.

In scenarios of FIG. 2 through FIG. 4, each small cell BS may operate as a stand-alone BS. That is, a UE may establish a single RRC connection with a small cell BS and may configure one or more Signaling Radio Bearers (SRBs), for the transmission of control plane data. For the transmission of user plane data, the UE may have one or more DRBs (Data Radio Bearers), between the UE and a small cell BS.

In the scenarios of FIG. 2 through FIG. 4, a UE may transmit data through one or more small BSs under a control of a macro cell BS (or through cooperation between the macro cell BS and one or more small cell BSs). Alternatively, the UE may transmit user plane data through cooperation between small cell BSs.

That is, the UE may establish a single RRC connection with the macro cell BS of FIG. 2 or FIG. 3 or the small cell BS of FIG. 4, and the UE may configure one or more SRBs (Signaling Radio Bearers) for transmission of control plane data. Alternatively, the UE may have one or more Data Radio Bearers (DRBs) through the macro cell BS of FIG. 2 or FIG. 3, or the small cell BSs of FIG. 4, for transmission of user plane data.

In the scenario of FIG. 2 or FIG. 3, a UE may have only a single RRC connection with a macro cell BS. In the scenario of FIG. 4, a UE may have only a single RRC connection with a single small cell BS.

In the scenarios of FIG. 2 to FIG. 4, in the RRC connection establishment/re-establishment/handover, a single serving cell may provide NAS mobility information (for example, Tracking Area Identity (TAI)). Also, in RRC connection re-establishment/handover, a single serving cell provides a security input. The cell is referred to as a primary cell (PCell). The PCell may be changed through a handover procedure.

Based on the capabilities of the UE, small cells may be configured as secondary cells (or added serving cells) under a control of the macro cell BS of FIG. 2 or FIG. 3 or the small cell BS of FIG. 4, which acts as a PCell (or through cooperation with a macro cell BS or a small cell BS, which acts as a PCell). Hereinafter, for ease of description, an added serving cell(s), which is a cell(s) of a small cell BS that is different from the macro cell BS of FIG. 2 or FIG. 3 or the small cell BS of FIG. 4, which acts as a PCell (or provides a PCell), and is configured to provide an additional radio resource to the UE, is expressed as a secondary cell(s).

That is, the UE may be controlled by the macro cell BS of FIG. 2 or FIG. 3 or the small cell BS of FIG. 4, which operates as a PCell, and the UE may perform communication through dual connectivity with at least one small cell that acts as a secondary cell.

The UE may execute a procedure of adding or removing a small cell as a secondary cell (SCell) under the control of the macro cell BS of FIG. 2 or FIG. 3 or the small cell BS of FIG. 4, which acts as a PCell (or through the cooperation with the macro cell BS or the small cell BS, which acts as a PCell). Also, the UE may execute a procedure of adding or cancelling one or more Data Radio Bearers (DRBs) through a small cell, based on an RRC signaling through the macro cell BS of FIG. 2 or FIG. 3 or the small cell BS of FIG. 4, which acts as a primary cell (PCell).

Hereinafter, a procedure of a UE for adding/modifying a cell of a small BS will be briefly described through an example.

When a UE is in an RRC connected mode by establishing an RRC connection with the macro cell BS of FIG. 2 or FIG. 3 or the small cell BS of FIG. 4, which acts as a PCell, the UE may add, as an SCell, a small cell (in the case of FIG. 4, another small cell included in a small cell cluster, which is different from a small cell that acts as a primary cell).

A BS of a cell that acts as a PCell (a macro cell BS or a small cell BS) may detect a new SCell candidate. After the detection, the BS of the PCell may determine the addition/modification of a SCell, so as to add an SCell BS cell or to modify a radio resource configuration dedicated information of a configured SCell BS cell. Subsequently, a BS of a cell that acts as a PCell (a macro cell BS or a small cell BS) may add/modify a SCell of a small cell BS through an RRC connection reconfiguration procedure.

When an RRC connection reconfiguration message received by the UE includes information associated with a list of SCells to be added/modified (SCellToAddModList), the UE may execute the addition or modification of an SCell.

The SCell list information associated with the list of SCells to be added/modified may include one or more piece of the following information.

- SCellindex (SCellIndex): an index used for identifying an SCell among SCells configured for a UE
- cell identifier (CellIdentification): information associated with an SCell (a Physical Cell Id (PCI) and an Absolute Radio Frequency Channel Number (ARFCN) of an SCell)
- radio resource configuration common SCell information (radioResourceConfigCommonScell): essential information for a UE to operate in an SCell, which includes common radio resource configuration information (for example, a physical layer parameter and a random access parameter) in system information
- radio resource configuration dedicated SCell information (radioResourceConfigCommonScell): UE-specific configuration information that is applied to an SCell (for example, physicalConfigDedicatedSCell and macMainConfigSCell)

When an SCell index included in the list of SCells to be added/modified is not a part of the current UE configuration, the UE adds an SCell corresponding to a cell identifier based on received radio resource configuration common SCell information and radio resource configuration dedicated SCell information.

That is, when the SCell index included in the SCell list information is different from an SCell configured for the UE, the UE may execute a procedure of adding a cell associated with the SCell index information as an SCell.

Unlike the above, the SCell index included in the SCell list information associated with a list of SCells to be added/modified is a part of the current UE configuration, the UE may modify the SCell based on the received radio resource configuration dedicated SCell information.

The above described information included in the SCell list information (e.g., information on a list of SCells to be added/modified) may be interrogated through an interface between a PCell BS and an SCell BS, before a macro cell BS or a small cell BS, which acts as a PCell, adds/modifies an SCell through an RRC connection reconfiguration procedure.

That is, a BS of the PCell may request required information and receive related information through an interface with a BS of an SCell to be added or modified.

As another method, information included in SCell list information (e.g., information on the list of SCells to be added/modified) may be used by a BS operating as a PCell, through previous Operations, Administration and Maintenance (OAM) or through information stored in a previous SCell addition/modification procedure.

Hereinafter, for ease of description, the macro cell BS of FIG. 2 or FIG. 3 or the small cell BS of FIG. 4, which operates as a PCell (or provides a PCell), will be expressed as a PCell BS, a first BS, or a master BS. Also, a small cell BS that operates as an SCell (or provides an SCell) will be expressed as an SCell BS, a second BS, or a secondary BS.

Also, in the present specification, a macro cell BS, a PCell BS, and a first BS may indicate the same meaning, and a small cell BS, a SCell BS, a secondary BS, and a second BS may indicate the same meaning.

As described, the PCell BS may execute the addition/modification of a SCell and may also configure radio resources for the PCell BS or a SCell BS. Hereinafter, this will be described in detail.

That is, the PCell BS may configure radio resources for a BS operating as a PCell and/or a BS operating as an SCell, through an RRC connection reconfiguration procedure.

Hereinafter, several examples will be described in association with a method of configuration radio resources for a BS operating as a PCell or a SCell.

a method of using radio resource configuration dedicated (radioResourceConfigDedicated) information A PCell BS may configure radio resources using a radio bearer addition/modification list (drb-ToAddModList) or a radio bearer release list (drb-ToReleaseList) of the radio resource configuration dedicated information.

For example, a predetermined radio bearer of the macro cell BS operating as a PCell is released, and the predetermined radio bearer may be added to a small cell BS operating as a SCell. In this instance, radio bearer release information of the radio bearer release list (drb-ToReleaseList) includes a radio bearer identifier (Data Radio Bearer Identity,drb-Identity) of a radio bearer to be released, and radio bearer addition/modification information of the radio bearer addition/modification list (drb-ToAddModList) may include an EPS bearer identifier (eps-BearerIdentity), drb-Identity, pdcp-Config, rlc-Config, logicalChannelIdentity, and logicalChannelConFIG.

The radio bearer release information may include cell identifier (for example, Physical Cell Identity (PCI)), PCell indication information, an index used for a UE to identify a cell, or PCell BS indication information. As another method, radio bearer release information may include only a drb-Identity to be released.

The radio bearer addition/modification information may include a cell identifier (for example, a PCI), a SCell index, an index used for a UE to identify a cell, or an SCell BS index/indication information. Through this, the UE may identify a predetermined radio bearer as a radio bearer that is configured through an SCell, an SCell BS, or secondary BS CCs.

As another example, a predetermined radio bearer of a macro cell BS operating as a PCell may be added/modified so that the predetermined radio bearer is processed through a PCell BS and a small cell BS operating as a secondary cell. In this instance, the radio bearer addition/modification information of the radio bearer addition/modification list (drb-ToAddModList) may include an EPS bearer identifier (eps-BearerIdentity), drb-Identity, pdcp-Config, rlc-Config, logicalChannelIdentity, and logicalChannelConFIG.

The radio bearer addition/modification information may include a cell identifier (for example, a PCI), a SCell index, an index used for a UE to identify a cell, or SCell BS index/indication information, or the radio bearer addition/modification information may include information for identifying a radio bearer that is configured through a PCell BS and a small cell BS operating as an SCell (or a serving cell).

As another example, a predetermined radio bearer processed through only a BS of a macro cell operating as a PCell may be added/modified. In this instance, the radio bearer addition/modification information may include an EPS bearer identifier (eps-BearerIdentity), drb-Identity, pdcp-Config, rlc-Config, logicalChannelIdentity, and logicalChannelConFIG.

The radio bearer addition/modification information may include a cell identifier (for example, a Physical Cell Identity (PCI)), PCell indication information, an index used for a UE to identify a cell, or PCell BS indication information. Through the above, the UE may identify a predetermined radio bearer as a radio bearer that is configured through a PCell, a PCell BS, or PCell BS CCs.

A method of using radio resource configuration dedicated SCell (radioResourceConfigDedicatedSCell) information A PCell BS may configure radio resources using a radio bearer addition/modification list (drb-ToAddModList) or a radio bearer release list (drb-ToReleaseList) of the radio resource configuration dedicated information.

Also, a PCell BS may configure radio resources for an SCell, by including a radio bearer addition/modification list (drb-ToAddModList) or a radio bearer release list (drb-ToReleaseList) in radio resource configuration dedicated SCell (radioResourceConfigDedicatedSCell) information.

For example, when a predetermined radio bearer of a BS of a macro cell operating as a PCell is released, and the released predetermined radio bearer is added to a small cell BS operating as an SCell, radio bearer release information of the radio bearer release list (drb-ToReleaseList) in the radio resource configuration dedicated (radioResourceConfigDedicated) information may include a radio bearer identifier (Data Radio Bearer Identity, drb-Identity) of a radio bearer to be released. Also, the radio bearer addition/modification information of the radio bearer addition/modification list (drb-ToAddModList) in the radio resource configuration dedicated SCell (radioResourceConfigDedicatedSCell) information may include an EPS bearer identifier (eps-BearerIdentity), drb-Identity, pdcp-Config, rlc-Config, logicalChannelIdentity, and logicalChannelConFIG.

The radio bearer release information may include a cell identifier (for example, a PCI), PCell identification information, an index used for a UE to identify a cell, or PCell BS indication information.

As another method, radio bearer release information may include only information on a drb-Identity of a DRB to be released.

As another method, the radio bearer release information may include a cell identifier (for example, a PCI), PCell indication information, an index used for a UE to identify a cell, or PCell BS indication information only when the radio bearer release information is included in the radio resource configuration dedicated SCell (radioResourceConfigDedicatedSCell) information.

Also, the radio bearer addition/modification information may include a cell identifier (for example, a PCI), an SCell index, an index used for a UE to identify a cell, or SCell BS index/indication information.

Similar to the radio bearer release information, the radio bearer addition/modification information may include a cell identifier (for example, a PCI), an SCell index, an index used for a UE to identify a cell, or SCell BS index/indication information only when the radio bearer release information is included in the radio resource configuration dedicated SCell (radioResourceConfigDedicatedSCell) information. Through the above, the UE may identify a predetermined radio bearer as a radio bearer that is configured through an SCell, an Secondary BS(SeNB), or Secondary BS(SeNB) CCs.

As another example, a predetermined radio bearer of a BS of a macro cell operating as a PCell may be added/modified so that the predetermined radio bearer is processed through the PCell BS and a small cell BS. In this instance, the radio bearer addition/modification information of the radio bearer addition/modification list (drb-ToAddModList) in the radio resource configuration dedicated SCell (radioResourceConfigDedicatedSCell) information may include an EPS bearer identifier (eps-BearerIdentity), drb-Identity, pdcp-Config, rlc-Config, logicalChannelIdentity, and logicalChannelCONFIG.

Also, the radio bearer addition/modification information may include a cell identifier (for example, a PCI), an SCell index, an index used for a UE to identify a cell, or SCell BS index/indication information, or may include information indicating that a radio bearer that is configured through a PCell BS and an SCell BS.

As another example, a predetermined radio bearer that is processed through only a BS of a macro cell operating as a PCell, may be added/modified. In this instance, the radio bearer addition/modification information may include a cell identifier (for example, a PCI), PCell indication information, an index used for a UE to identify a cell, or PCell BS indication information. Through the above, the UE may identify a predetermined radio bearer as a radio bearer that is configured through a PCell, a PCell BS, or PCell BS CCs.

As described above, information included in the radio bearer addition/modification list (drb-ToAddModList), the radio bearer release list (drb-ToReleaseList), or the radio resource configuration dedicated SCell (radioResourceConfigDedicatedSCell), may be generated through a procedure through an X2 interface between the macro cell BS of FIG. 2 or FIG. 3 and a small cell BS, or between the small cell BS of FIG. 4 and another small cell BS, before a PCell BS adds/modifies and/or releases a radio bearer through an RRC connection reconfiguration procedure. That is, the PCell BS may request required information and receive related information through an interface with a SCell BS to be added or modified.

Hereinafter, a method of activating/deactivating a SCell will be briefly described through an example.

As described above, when a PCell BS configures radio resources (for example, DRBs) with respect to a SCell BS through an RRC connection reconfiguration procedure (or to configure radio resources, or based on a measured level of an SCell included in a measurement report of a small cell configured as an SCell), a network may activate or deactivate an SCell of a small cell BS operating as an SCell using the following methods.

A method of using a MAC signaling by a PCell BS

A PCell BS may activate/deactivate a small cell configured as a SCell by sending an activation/deactivation MAC Control Element (CE).

A UE maintains a SCell deactivation timer (sCellDeactivationTimer) with respect to the configured SCell. The UE deactivates a SCell associated with the expiry of the timer. The SCell deactivation timer may be configured by an upper layer signaling (for example, an RRC message).

When the UE receives an activation/deactivation MAC CE that activates an SCell at a corresponding Transmission Time Interval (TTI), the UE activates an SCell at the corresponding TTI, with respect to each TTI and each configured SCell.

That is, a normal SCell operation (SRS transmissions on the small cell, CQI/PMI/RI/PTI reporting for the small cell, PDCCH monitoring on the small cell, PDCCH monitoring for the small cell), may be applied. The UE starts an SCell deactivation timer associated the SCell.

However, when the UE receives an activation/deactivation MAC that deactivates an SCell at a corresponding TTI or when the SCell deactivation timer expires at a corresponding TTI, the UE deactivates an SCell at the corresponding TTI, stops the SCell deactivation timer, and flushes a Hybrid automatic repeat request (HARQ) associated with the SCell.

When a Physical Downlink Control Channel (PDCCH) with respect to an activated SCell indicates uplink grant or downlink assignment, or when a PDCCH with respect to a serving cell that schedules an activated SCell indicates uplink grant or downlink assignment, the UE may restart a SCell deactivation timer associated with the SCell.

When a small cell configured as a SCell is activated, a PCell BS may configure a radio bearer resource (for example, add a DRB) with respect to a BS of the small cell configured as an SCell. That is, when the PCell BS desires to configure a radio bearer resource with respect to the SCell BS, the PCell BS needs to activate the small cell configured as a SCell which has been in a deactivated state, or needs to be aware that the small cell is in an activated state.

As another method, when the PCell BS configures a radio bearer resource (for example, add a DRB) for a small cell BS configured as a SCell, the PCell BS maintains the SCell of the small cell BS as an activated state. That is, when the PCell BS configures a radio bearer resource with respect to the SCell BS, the SCell is maintained as an activated state until the radio resource is released (for example, a DRB is released).

For example, in the case of activation, when a deactivation timer value is set to infinity or when a DRB is added/configured for an SCell BS, or when an SCell is configured as a small cell and a radio resource (for example, a DRB) is configured, the SCell is maintained as an activated.

As another method, in the state in which a radio resource is configured (for example, a DRB is added) for a small cell BS configured as an SCell, when the SCell is deactivated, the PCell BS activates the SCell for transmitting data through the deactivated SCell.

The PCell BS and an SCell BS may exchange information associated with activation/deactivation of an SCell through an interface between the PCell BS and the SCell BS.

An activation/deactivation method using a MAC signaling through an SCell BS

A PCell BS may activate/deactivate a small cell operating as an SCell by sending an activation/deactivation MAC Control Element (CE).

A UE maintains an SCell deactivation timer with respect to the configured SCell. The UE deactivates an SCell associated with the expiry of the timer. The SCell deactivation timer may be configured by an upper layer signaling (for example, an RRC message).

When the UE receives an activation/deactivation MAC CE that activates an SCell at a corresponding Transmission Time Interval (TTI), the UE activates an SCell at the corresponding TTI, with respect to each TTI and each configured SCell.

That is, a normal SCell operation (SRS transmissions on the small cell, CQI/PMI/RI/PTI reporting for the small cell, PDCCH monitoring on the small cell, PDCCH monitoring for the small cell), may be applied. Also, the UE starts an SCell deactivation timer associated the SCell.

When the UE receives an activation/deactivation MAC that deactivates an SCell at a corresponding TTI or when the SCell deactivation timer expires at a corresponding TTI, the UE deactivates an SCell at the corresponding TTI, stops the SCell deactivation timer, and flushes a HARQ buffer associated with the SCell.

When a PDCCH with respect to an activated SCell indicates uplink grant or downlink assignment, or when a PDCCH with respect to a serving cell that schedules an activated SCell indicates uplink grant or downlink assignment, the UE may restart an SCell deactivation timer associated with the SCell.

When a small cell configured as an SCell is activated, the PCell BS may configure a radio bearer resource (for example, add a DRB) with respect to the small cell BS configured as an SCell. That is, when the PCell BS desires to configure a radio bearer resource with respect to the SCell BS, the PCell BS needs to activate the small cell configured as an SCell which has been in a deactivated state, or needs to be aware that the small cell is in an activated state.

As another method, when the PCell BS configures a radio bearer resource (for example, add a DRB) for a small cell BS configured as an SCell, the PCell BS maintains the SCell of the small cell BS as an activated state. That is, when the PCell BS configures a radio bearer resource with respect to the SCell BS, the SCell is maintained as an activated state until the radio resource is released (for example, a DRB is released). For example, in the case of activation of an SCell, when a deactivation timer value is set to infinity or when a DRB is added/configured for an SCell BS, or when an SCell is configured as a small cell and a DRB is configured, the SCell is maintained as an activated.

As another method, when a small cell configured as an SCell is activated by the PCell, an SCell BS may deactivate the activated SCell.

The PCell BS and the SCell BS may exchange information associated with activation/deactivation of the SCell through an interface between the PCell BS and the SCell BS.

An activation/deactivation method using an RRC signaling through a PCell BS

A PCell may activate/deactivate an SCell by transmitting, to a UE, an RRC connection reconfiguration message including information for activation/deactivation of an SCell.

As another method, when the PCell BS may add/modify an SCell (small cell), or configure a radio bearer resource (for example, add a DRB) with respect to an SCell BS (small cell BS), the PCell BS may activate/deactivate an SCell by transferring, to a UE, an RRC connection reconfiguration message including information for activation/deactivation.

The UE maintains an SCell deactivation timer with respect to the configured SCell. The UE deactivates an SCell associated with the expiry of the timer. The SCell deactivation timer may also be configured by an upper layer signaling (for example, an RRC message).

As another method, when a UE receives an RRC connection reconfiguration message for adding/modifying an SCell (small cell) or for configuring a radio resource for an SCell (small cell BS), from the PCell, the UE may maintain the configured SCell as an activated state until the SCell is removed or a radio resource is released (for example, a DRB is released).

A method of adding/modifying an SCell and a method of configuring radio resource of a PCell or an SCell have been briefly described.

Hereinafter, in the state in which a UE establishes an RRC connection with a PCell as described above, when the UE configures radio resources through an SCell BS and transmits user data, a method for the UE to identify a buffer status report of a radio resource (DRB) associated with each BS and to provide the buffer status report to a corresponding BS, will be described in detail.

A buffer status report procedure is used to provide information on an amount of data available for transmission in uplink buffers of the UE to a serving BS.

A PCell BS may configure a radio resource (for example, a DRB) for a PCell BS and/or an SCell BS through an RRC connection reconfiguration procedure.

In this instance, radio bearer addition/modification information associated with the configured radio resource may include one or more pieces of information from among eps-BearerIdentity (EPS bearer identifier), drb-Identity, pdcp-Config, rlc-Config, logicalChannelIdentity (logical channel identifier), and logicalChannelConf g (logical channel configuration information).

For example, the logical channel configuration information may be configured as shown below and may be transmitted.

An example of the logical channel configuration information (logicalChannelConfig)

```
-- ASN1START

LogicalChannelConfig ::=      SEQUENCE {
    ul-SpecificParameters         SEQUENCE {
        priority                      INTEGER (1..16),
        prioritisedBitRate            ENUMERATED {
                                          kBps0, kBps8, KBps16, KBps32, KBps64, KBps128,
                                          kBps256, infinity, kBps512-v1020, kBps1024-v1020,
                                          kBps2048-v1020, spare5, spare4, spare3, spare2,
                                          spare1],
        bucketSizeDuration            ENUMERATED {
                                          ms50, ms100, ms150, ms300, ms500, ms1000, spare2,
                                          spare1],
        logicalChannelGroup           INTEGER (0..3)           OPTIONAL        -- Need OP
    }   OPTIONAL,                                                              -- Cond UL
    ...,
    [[ logicalChannelSR-Mask-r9   ENUMERATED {SETUP}       OPTIONAL        -- Cond SRmask
    ]]
]

-- ASN1STOP
```

Information included in each field of the logical channel configuration information (logicalChannelConfig) is briefly described as follows.
  bucket size duration (bucketSizeDuration): information on a bucket size duration for logical channel prioritization
  logical channel group (logicalChannelGroup): Information on logical channel group mapping (an integer in a range from 0 to 3) of a logical channel for BSR reporting prioritized bit rate (prioritisedBitRate): information on a prioritized bit rate for logical channel prioritization priority: information on logical channel prioritization (an integer in a range from 1 to 16)

Figure 5:
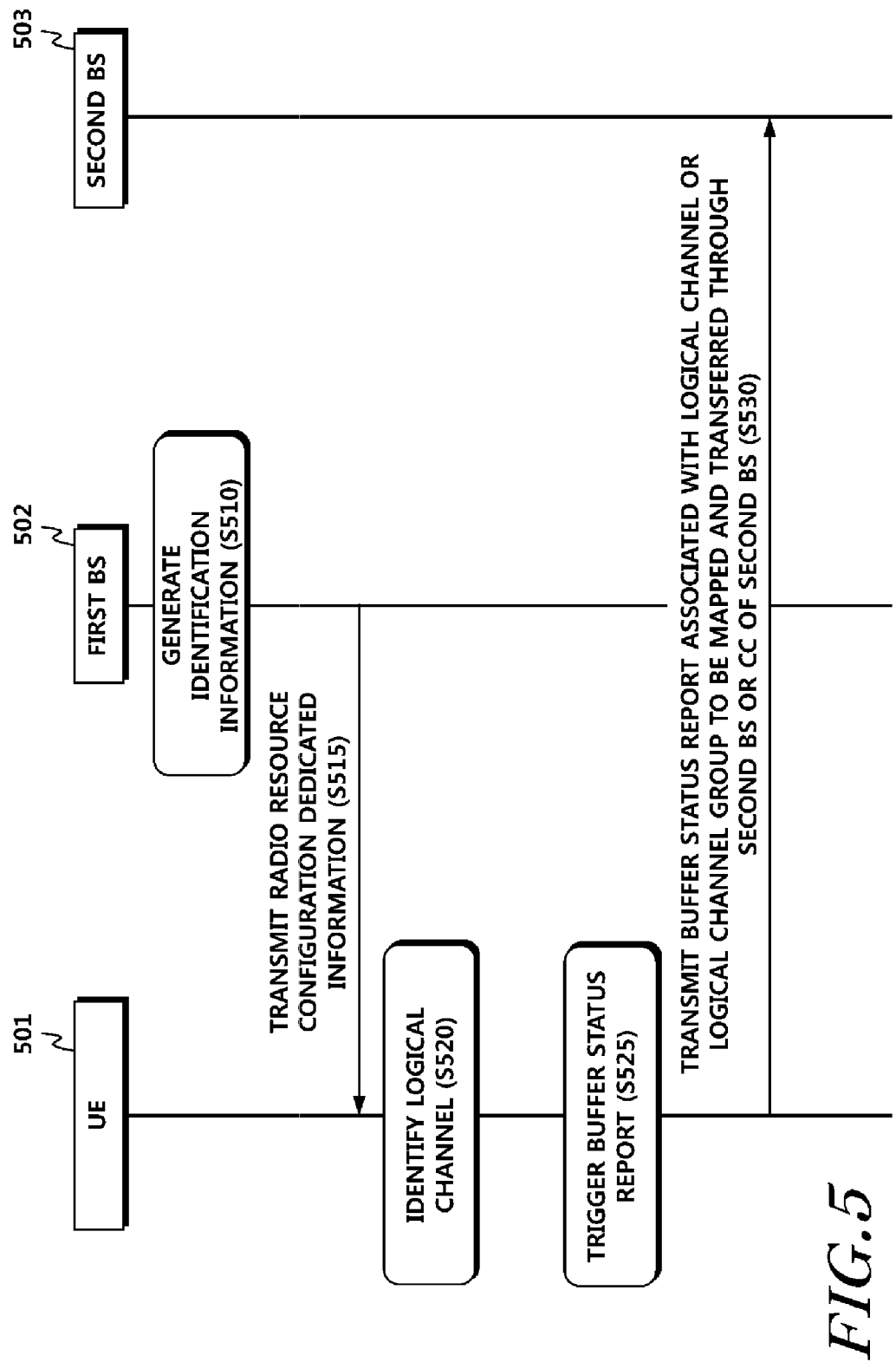
FIG. 5 is a diagram illustrating an example of operations of a User Equipment (UE) and a Base Station (BS) according to an embodiment.

FIG. 5 is a diagram illustrating an example of operations of a UE and a BS according to at least one embodiment.

According to an embodiment, a method is provided for transmitting a buffer status report by a UE that configures dual connectivity with a first BS and a second BS which are connected through a non-ideal backhaul. The method includes i) receiving, from the first BS, an RRC reconfiguration message including identification information for distinguishing a radio bearer to be transferred through the first BS or Component Carriers (CCs) of the first BS from a radio bearer to be transferred through the second BS or CCs of the second BS, ii) distinguishing logical channels to be mapped and transferred through the first BS or the CCs of the first BS from logical channels to be mapped and transferred through the second BS or the CCs of the second BS, in a MAC layer, iii) triggering a buffer status report by distinguishing a buffer status of the logical channels or a logical channel group to be mapped and transferred through the first BS or the CCs of the first BS from a buffer status of logical channels or a logical channel group to be mapped and transferred through the second BS or the CCs of the second BS, and iv) transmitting, to the first BS, a buffer status report associated with the logical channels or the logical group to be mapped and transferred through the first BS or the CCs of the first BS, and v) transmitting, to the second BS, a buffer status report associated with the logical channels or the logical group to be mapped and transferred through the second BS or the CCs of the second BS. When the UE configures dual connectivity with the first BS (PCell BS) and the second BS (SCell BS), the UE may transmit buffer status report information of a predetermined radio bearer to a BS to which the predetermined radio bearer is mapped, with respect to radio bearers configured by being mapped to the first BS and radio bearers configured by being mapped to the second BS.

For example, a buffer status report associated with a first bearer configured through the first BS is transferred to the first BS, and a buffer status report associated with a second bearer configured through the second BS is transferred to the second BS.

Also, each of the first BS and the second BS forms a Serving-Gate Way (S-GW) and an S1-U interface. Thus, each of the first BS and the second BS may configure a radio bearer having an independent PDCP layer. In other words, the first BS forms an S-GW and a single S1-U interface, and the second BS forms an S-GW and a separate S1-U interface.

fying the second BS or a component carrier(s) of an SCell(s) provided by the second BS, identifying a logical channel(s) to be transmitted to the second BS or the component carrier(s) of the SCell(s) based on the radio resource configuration dedicated information, triggering a buffer status report based on a buffer status of the identified logical channel(s), and transmitting a buffer status report to the second BS or the component carrier(s) of the SCell(s).

Referring to FIG. 5, a UE 501 receives, from a first BS (a PCell BS 502), radio resource configuration dedicated information including identification information for identifying a small cell configured as a second BS SCell, a small cell BS, or CCs of the small cell BS, in operation S515. The radio resource configuration dedicated information may be included in an upper layer signaling (for example, an RRC reconfiguration message).

The UE 501 may identify a logical channel that is processed through a second BS (an SCell BS 503) or a component carrier(s) (CCs) of an SCell(s), based on the indication information included in the radio resource configuration dedicated information and/or radio resource configuration dedicated SCell (radioResourceConfigDedicatedSCell) information, in a MAC layer, in operation S520.

Subsequently, the UE 501 may trigger a buffer status report when a buffer status triggering event occurs based on a buffer status of each identified logical channel that is processed through the second BS (the SCell BS 503) or the CC(s) of the SCell(s), in operation S525.

The UE 501 transmits a buffer status report associated with the identified logical channel to the second BS 503 or the CC(s) of the SCell(s), in response to the buffer status report triggering, in operation S530.

Each operation of the UE 501 according to the above described present embodiment will be described in detail.

The UE 501 may map logical channels to be transmitted through a small cell configured as an SCell, a small cell BS, or Component Carriers (CCs) of the small cell BS to transport channels (for example, Uplink Shared Channels (UL-SCHs)) to be transmitted through the small cell configured as an SCell, the small cell BS, or the CCs of the small cell BS, in a MAC layer. That is, a predetermined logical channel(s) may be transmitted through predetermined CCs.

To this end, the UE receives radio resource dedicated information including information for executing the identification, from the PCell BS (the first BS 502) through an upper layer signaling, in operation S515.

For example, the radio resource configuration dedicated information may include radio bearer addition/modification information, provided below.

DRB-ToAddModList

| | | | |
|---|---|---|---|
| DRB-ToAddModList ::= | SEQUENCE (SIZE (1..maxDRB)) OF DRB-ToAddMod | | |
| DRB-ToAddMod ::= SEQUENCE [ | | | |
| eps-BearerIdentity | INTEGER (0..15) | OPTIONAL, | -- Cond DRB-Setup |
| drb-Identity | DRB-Identity, | | |
| pdcp-Config | PDCP-Config | OPTIONAL, | -- Cond PDCP |
| rlc-Config | RLC-Config | OPTIONAL, | -- Cond Setup |
| logicalChannelIdentity | INTEGER (3..10) | OPTIONAL, | -- Cond DRB-Setup |
| logicalChannelConfig | LogicalChannelConfig | OPTIONAL, | -- Cond Setup |
| ... | | | |
| ] | | | |

Also, a method of the UE according to another embodiment of the present invention may further include receiving, from the first BS, radio resource configuration dedicated information including identification information for identi- The radio bearer addition/modification information may include one or more pieces of information from among eps-BearerIdentity (EPS bearer identifier), drb-Identity, pdcp-Config, rlc-Config, logicalChannelIdentity (logical channel identifier), and logicalChannelConfig (logical channel configuration information).

The above described identification information may be included in different information fields, and each case will be described.

The identification information that the UE receives in the present embodiment may include at least one of a cell identifier, an SCell index, cell identification index information, and SCell BS index/indication information. The identification information may be included in and received through radio bearer addition/modification information or logical channel configuration information in operation S515.

Particularly, for example, the UE 501 includes a cell identifier (for example, a PCI), an SCell index, an index used for a UE to identify a cell, or an SCell BS index/indication information in the radio bearer addition/modification, and may identify a radio bearer configured through a small cell configured as an SCell, a small cell BS, or CCs of the small cell BS, in operation S520.

Alternatively, for example, the UE 501 includes a cell identifier (for example, a PCI), an SCell index, an index used for a UE to identify a cell, or an SCell BS index/indication information in the logical channel configuration information (logicalChannelConfig), and may identify a radio bearer configured through a small cell configured as an SCell, a small cell BS, or CCs of the small cell BS, in operation S520. That is, information that identifies a predetermined radio bearer as a radio bearer that is configured through a small cell configured as an SCell, a small cell BS, or small cell BS CCs, may be included in and received through the logical channel configuration information, in operation S515.

The UE 501 may map a predetermined logical channel(s) by identifying a predetermined small cell configured as an SCell, a predetermined small cell BS or predetermined small cell BS CCs, based on the identification information, in a MAC layer.

Also, the identification information that the UE 501 receives according to another embodiment may include field designation information or field extension information for identifying the second BS or the CC(s) of the SCell(s), in a field include in one of logical channel group information, priority information, and logical channel identifier information, in operation S515.

The case in which the UE identifies a logical channel based on the identification information included in the logical channel group information will be described. A predetermined value may be designated in a logical channel group field which is formed of two bits and has a value in a range from 0 to 3, so as to identify a small cell configured as an SCell, a small cell BS, or small cell BS CCs, or the number of bits is extended (for example, 3 bits, 4 bits, 5 bits, or more) and a predetermined value may be designated to identify a small cell configured as an SCell, a small cell BS, or small cell BS CCs, in operation S520.

As another method, the case in which the UE identifies a logical channel based on the identification information included in the priority information will be described. A predetermined value may be designated in a priority field which may have a value in a range from 1 to 16, so as to identify a small cell configured as an SCell, a small cell BS, or small cell CCs, or the number of bits is extended and a predetermined value may be designated to identify a small cell configured as an SCell, a small cell BS, or small cell BS CCs.

As another method, the case in which the UE identifies a logical channel based on the identification information included in the logical channel identifier information will be described. A predetermined value out of logical channel identifiers 3 to 10 may be used by mapping the same to an identifier (index/indication information) of a small cell, a small cell BS, or small cell BS CCs. For example, logical channels 3 to 4 or 3 to 5 may be used as a PCell logical channel identifier, and logical channels 5 to 10 or 6 to 10 may be used by mapping as a logical channel identifier of a small cell, a small cell BS, or small cell BS CCs.

The case in which the above described radio resource configuration dedicated information and/or radio resource configuration dedicated SCell (radioResourceConfigDedicatedSCell) includes identification information for identifying the second BS or the CC(s) of the SCell(s) has been described.

Hereinafter, the case in which the radio resource configuration dedicated information includes identification information for identifying a radio bearer that is transferred through only a first BS or a CC(s) of a PCell, will be described.

According to another embodiment, a method is provided for a UE to transmit a buffer status report through dual connectivity with a first BS operating as a PCell and a second BS operating as an SCell. The method includes receiving, from the first BS, radio resource configuration dedicated information including identification information for identifying a radio bearer transferred through only the first BS or a CC(s) of the PCell BS, identifying a logical channel(s) to be transmitted through the first BS or the CC of the PCell BS based on the radio resource configuration dedicated information, triggering a buffer status report based on a buffer status of the identified logical channel(s), and transmitting a buffer status report to the first BS, the CC of the PCell, or first BS cell.

The UE 501 receives, from the first BS (the PCell BS 502) radio resource configuration dedicated information including information that identifies a macro cell configured as a PCell, a macro cell BS, or macro cell BS CCs, for radio bearers processed through only a BS of a macro cell operating as a PCell, in operation S515. The radio resource configuration dedicated information may be received by being included in an upper layer signaling (for example, an RRC reconfiguration message).

The UE 501 may identify a logical channel that is processed through the first BS (PCell BS 502) or the CCs of the PCell BS, based on the above described radio resource configuration dedicated information, in a MAC layer.

Subsequently, the UE 501 may trigger a buffer status report when a buffer status triggering event occurs based on a buffer status of the identified logical channel(s) that is processed through the first BS (the PCell BS 502) or the CC(s) of the PCell(s), in operation S520.

The UE 501 transmits a buffer status report associated with the identified logical channel to the first BS 502 or the CC(s) of the PCell(s), in response to the buffer status report triggering.

Each operation of the UE according to the above described present embodiment will be described in detail.

The UE may map logical channels to be transferred through a macro cell configured as a PCell, a macro cell BS, or Component Carriers (CCs) of the macro cell BS to transport channels (for example, Uplink Shared Channels (UL-SCHs)) to be transmitted through the macro cell configured as a PCell, the macro cell BS, or the CCs of the macro cell BS, in a MAC layer. That is, a predetermined logical channel(s) may be transmitted through predetermined CCs.

To this end, the UE receives radio resource dedicated information including information for executing the identification, from the PCell BS (the first BS) through an upper layer signaling.

For example, the radio resource configuration dedicated information may include radio bearer addition/modification information, provided below.

DRB-ToAddModList

| DRB-ToAddModList ::= | SEQUENCE (SIZE (1..maxDRB)) OF DRB-ToAddMod | | | |
|---|---|---|---|---|
| DRB-ToAddMod ::= | SEQUENCE [ | | | |
| eps-BearerIdentity | | INTEGER (0..15) | OPTIONAL, | -- Cond DRB-Setup |
| drb-Identity | | DRB-Identity, | | |
| pdcp-Config | | PDCP-Config | OPTIONAL, | -- Cond PDCP |
| rlc-Config | | RLC-Config | OPTIONAL, | -- Cond Setup |
| logicalChannelIdentity | | INTEGER (3..10) | OPTIONAL, | -- Cond DRB-Setup |
| logicalChannelConfig | | LogicalChannelConfig | OPTIONAL, | -- Cond Setup |
| ... | | | | |
| ] | | | | |

The radio bearer addition/modification information may include one or more pieces of information from among eps-BearerIdentity (EPS bearer identifier), drb-Identity, pdcp-Config, rlc-Config, logicalChannelIdentity (logical channel identifier), and logicalChannelConfig (logical channel configuration information).

The above described identification information may be included in different information fields, and each case will be described.

The identification information that the UE receives in the present invention may include at least one of a cell identifier, a PCell indication information, cell identification index information, and PCell BS indication information, and may be received by being included in radio bearer addition/modification information or logical channel configuration information.

Particularly, for example, the UE includes a cell identifier (for example, a PCI), PCell indication information, an index used for a UE to identify a cell, or PCell BS indication information in the radio bearer addition/modification, and may identify a radio bearer configured through a macro cell configured as a PCell, a macro cell BS, or macro cell BS CCs.

Alternatively, the UE includes a cell identifier (for example, a PCI), PCell indication information, an index used for a UE to identify a cell, or PCell BS indication information in the logical channel configuration information (logicalChannelConfig), and may identify a radio bearer configured through a macro cell configured as a PCell, a macro cell BS, or macro cell BS CCs. That is, information that identifies a predetermined radio bearer as a radio bearer that is configured through a macro cell configured as a PCell, a macro cell BS, or macro cell BS CCs, may be received by being included in the logical channel configuration information.

The UE may map a predetermined logical channel(s) by identifying a predetermined macro cell configured as a PCell, a predetermined macro cell BS or predetermined macro cell BS CCs, based on the identification information, in a MAC layer. Also, the identification information that the UE receives according to another embodiment of the present invention may include field designation information or field extension information for identifying the first BS or the CC(s) of the PCell, in a field include in one of logical channel group information, priority information, and logical channel identifier information.

The case in which the UE identifies a logical channel based on the identification information included in the logical channel group information will be described. A predetermined value may be designated in a logical channel group field which is formed of two bits and has a value in a range from 0 to 3, so as to identify a macro cell configured as a PCell, a macro cell BS, or macro cell BS CCs, or the number of bits is extended (for example, 3 bits, 4 bits, 5 bits, or more) and a predetermined value may be designated to identify a macro cell configured as a PCell, a macro cell BS, or macro cell BS CCs.

As another method, the case in which the UE identifies a logical channel based on the identification information included in the priority information will be described. A predetermined value may be designated in a priority field which may have a value in a range from 1 to 16, so as to identify a macro cell configured as a PCell, a macro cell BS, or macro cell BS CCs, or the number of bits is extended and a predetermined value may be designated to identify a macro cell configured as a PCell, a macro cell BS, or macro cell BS CCs.

As another method, the case in which the UE identifies a logical channel based on the identification information included in the logical channel identifier information will be described. A predetermined value out of logical channel identifiers 3 to 10 may be used by mapping the same to an identifier (index/indication information) of a macro cell configured as a PCell, a macro cell BS, or macro cell BS CCs. For example, logical channels 3 to 4 or 3 to 5 may be used as a macro cell BS logical channel identifier, and logical channels 5 to 10 or 6 to 10 may be used by mapping as a logical channel identifier of a small cell, a small cell BS, or small cell BS CC.

Cases in which the UE 501 receives the identification information by being included in different fields included in the radio resource configuration dedicated information, and examples in which the UE 501 identifies a logical channel in association with each case have been exemplified.

Hereinafter, a method of the UE 501 to identify a logical channel based on received identification information will be described in detail.

The UE according to an embodiment may identify a logical channel of a radio bearer configured through only a predetermined cell, a predetermined BS, or a predetermined BS cell(s), based on one piece of information from among a cell identifier, PCell indication information/SCell index, cell identification index information, and a PCell BS index (indication information)/SCell BS index (indication information), or based on one of a logical channel group, a priority value, and a logical channel identifier, in operation S520.

Each case will be described in detail.

The UE may identify logical channels to be transferred through a predetermined small cell configured as an SCell, a predetermined small cell BS, or predetermined small cell BS CCs, in a MAC layer, based on a cell identifier (for example, a PCI), an SCell index, an index used for the UE to identify a cell, or SCell BS index/indication information.

Alternatively, the UE may identify the logical channels to be transferred through a predetermined small cell configured as an SCell, a predetermined small cell BS, or predetermined small cell BS CCs, in a MAC layer, by grouping the logical channels into a predetermined identical Logical Channel Group (LCG).

As another method, the UE may identify logical channels to be transferred through a predetermined small cell configured as an SCell, a predetermined small cell BS, or predetermined small cell BS CCs, in a MAC layer, by assigning a predetermined priority value.

As another method, the UE may identify logical channels to be transferred through a predetermined small cell configured as an SCell, a predetermined small cell BS, or predetermined small cell BS CCs, in a MAC layer, by assigning a predetermined logical channel identifier.

The above described UE may identify logical channels to be transferred through a predetermined small cell, a predetermined small cell BS, or predetermined small cell BS CCs, in a MAC layer, based on identification information received from the first BS (PCell BS 502), in operation S520.

When the UE triggers a buffer status report (for example, "Regular BSR", "Periodic BSR", and "Padding BSR"), the UE distinguishes a buffer status of logical channels or a buffer status of a logical channel group including logical channels to be transferred through each small cell configured as an SCell, each small cell BS, or each small cell BS CC(s), and executes triggering through the small cell configured as an SCell, the small cell BS, or the small cell BS CC(s), in operation S525.

Alternatively, the UE may report an uplink buffer status of logical channels or a logical channel group including logical channels to be transferred through a predetermined small cell configured as an SCell, a predetermined small cell BS, or predetermined small cell BS CCs, through the predetermined small cell configured as an SCell, the predetermined small cell BS, or the predetermined small cell BS CCs, in operation S530.

As described above, the UE may identify logical channels to be transferred through a small cell configured as an SCell, a small cell BS, or CCs of the small cell BS, based on logical channel configuration information (for example, logical channel group and the like), in a MAC layer. Therefore, when the UE triggers a buffer status report, the UE may perform triggering by identifying a buffer status for each small cell configured as an SCell, each small cell BS, or each small cell BS CC(s). That is, when the UE triggers a buffer status report, the UE may trigger reporting a buffer status report associated with logical channels or a logical channel group including logical channels, to be transferred through a predetermined small cell configured as an SCell, a predetermined small cell BS, or predetermined small cell BS CCs.

As another example, the UE may identify logical channels to be transferred through a predetermined macro cell configured as a PCell, a predetermined macro cell BS, or CCs of the predetermined macro cell BS, based on a cell identifier (for example, a PCI), macro cell indication information, an index used for a UE to identify a cell, or macro cell BS indication information.

Alternatively, the UE may identify logical channels to be transferred through a predetermined macro cell configured as a PCell, a predetermined macro cell BS, or predetermined macro cell BS CCs in a MAC layer, by grouping the logical channels into a predetermined identical Logical Channel Group (LCG).

As another method, the UE may identify logical channels to be transferred through a predetermined macro cell configured as a PCell, a predetermined macro cell BS, or predetermined macro cell BS CCs, in a MAC layer, by assigning a predetermined priority value.

As another method, the UE may identify logical channels to be transferred through a predetermined macro cell configured as a PCell, a predetermined macro cell BS, or predetermined macro cell BS CCs, in a MAC layer, by assigning a predetermined logical channel identifier.

The above described UE may identify logical channels to be transferred through a predetermined macro cell, a predetermined macro cell BS, or predetermined macro cell BS CCs, based on identification information received from the first BS (PCell BS).

When the UE triggers a buffer status report (for example, "Regular BSR", "Periodic BSR", and "Padding BSR"), the UE identifies a buffer status of logical channels or a buffer status of a logical channel group including logical channels to be transferred through a macro cell configured as a PCell, a macro cell BS, or macro cell BS CCs, and executes triggering through the macro cell configured as a PCell, the macro cell BS, or the macro cell BS CCs.

Alternatively, the UE may report an uplink buffer status of logical channels or a logical channel group including logical channels to be transferred through a predetermined macro cell configured as a PCell, a predetermined macro cell BS, or predetermined macro cell BS CCs, through the predetermined macro cell configured as a PCell, the predetermined macro cell BS, or the predetermined macro cell BS CCs.

As described above, the UE may identify logical channels to be transferred through a macro cell configured as a PCell, a macro cell BS, or CCs of the macro cell BS, based on logical channel configuration information (for example, logical channel group and the like), in a MAC layer. Therefore, when the UE triggers a buffer status report, the UE may execute triggering by identifying a buffer status for a macro cell configured as a PCell, a macro cell BS, or CCs of the macro cell BS. That is, when the UE triggers a buffer status report, the UE may trigger reporting a buffer status report associated with logical channels or a logical channel group including logical channels, to be transferred through a predetermined macro cell configured as a PCell, a predetermined macro cell BS, or predetermined macro cell BS CCs.

Figure 6:
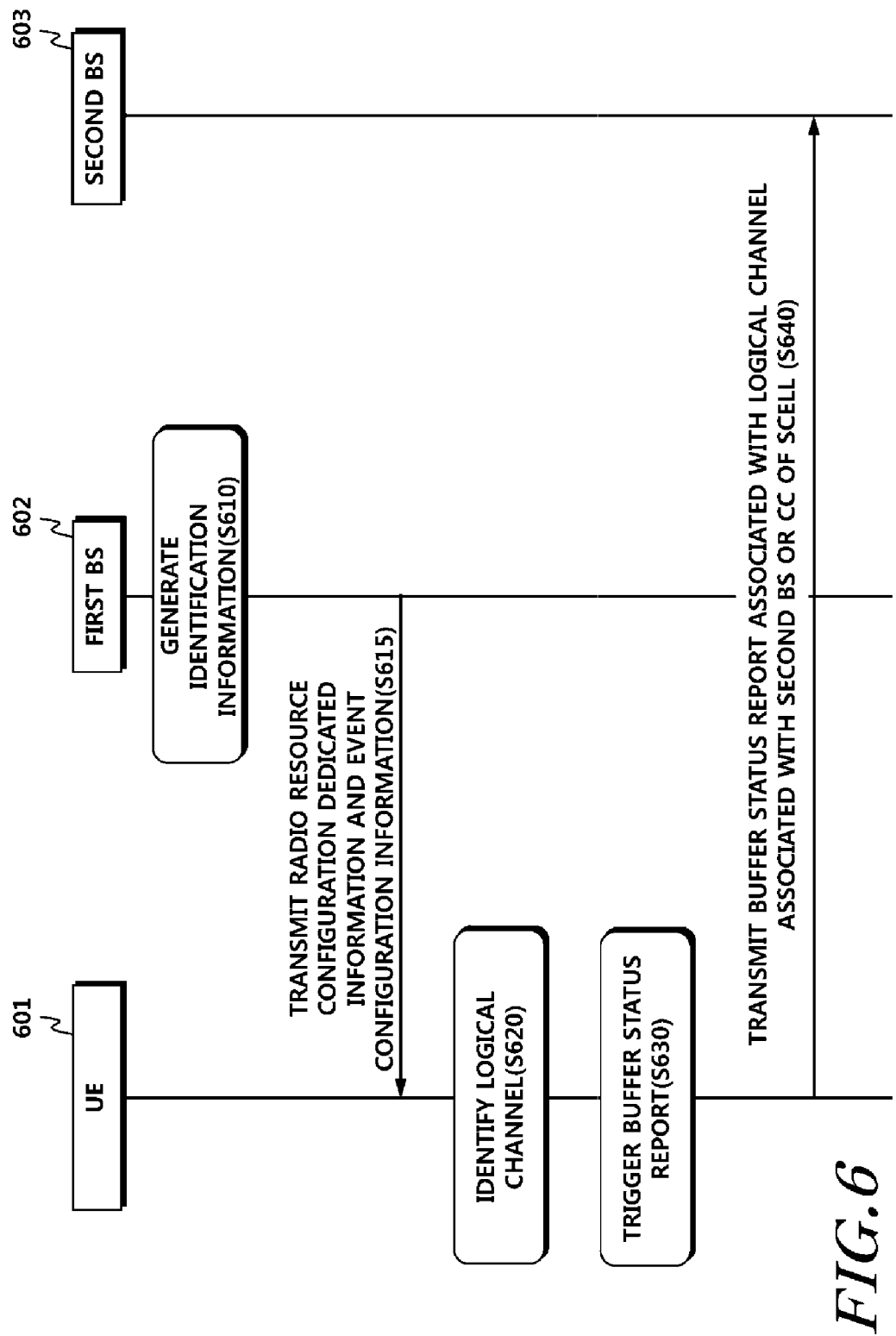
FIG. 6 is a diagram illustrating another example of operations of a UE and a BS according to another embodiment.

FIG. 6 is a diagram illustrating another example of operations of a UE and a BS according to another embodiment.

In a process of triggering a buffer status report, a UE according to an embodiment may receive uplink shared channel configuration information including event configuration information for triggering a buffering status report with respect to a second BS or CCs of an SCell BS. The UE may determine whether an event occurs based on the event configuration information, and may trigger a buffer status report.

Referring to FIG. 6, a UE 601 receives radio resource configuration dedicated information including identification information from a first BS (PCell BS 602), in operation S615.

When the UE 601 receives the radio resource configuration dedicated information including identification information from the first BS (PCell BS 602), the UE 601 may receive uplink shared channel configuration information including event configuration information for triggering a buffer status report with respect to a second BS or component carrier(s) of an SCell BS, together, in operation S615.

The uplink shared channel configuration information may be generated by a procedure performed through an X2 interface between the first BS and the second BS. That is, the PCell BS may request required information and receive related information through an interface with an SCell BS to be added or modified.

The UE 601 may identify a logical channel based on identification information through the above described method, in operation S620.

Subsequently, the UE 601 triggers a buffer status report when the following event occurs in operation S630, and transmits a buffer status report associated with a logical channel identified based on the second BS 603 or the component of the SCell, in operation S640.

A process in which the UE 601 triggers a buffer status report will be described in detail.

For example, a buffer status report may be triggered when the following event occurs in operation S630.

Uplink data is available with respect to a single logical channel included in a single logical channel group (LCG) from among logical channels to be transferred through a small cell configured as an SCell, a small cell BS, or CCs of the small cell BS. Also, the available data may be unavailable with respect to a logical channel included in the logical channel group or any of logical channels included in a single logical channel group, which has a priority that is higher than logical channels associated with the available data. In this instance, the UE transmits a "Regular BSR" through a small cell configured as an SCell, a small cell BS, or CCs of the small cell.

When an uplink resource is assigned through a small cell configured as an SCell, a small cell BS, or CCs of the small cell BS, and the number of padding bits is greater than or equal to a size obtained by adding a MAC control element and a subheader thereof, the UE may send a "Padding BSR" through the small cell configured as an SCell, the small cell BS, or the CCs of the small cell BS.

When a retransmission BSR timer (retxBSR-Timer) expires and a UE has available data for transmission associated with any of logical channels included in a logical channel group, the UE sends a "Regular BSR."

When a periodic BSR timer (periodicBSR-Timer) expires, a UE sends a "Periodic BSR" through a small cell configured as an SCell, a small cell BS, or CCs of the small cell BS.

The above described event configuration information (for example, the retransmission BSR timer and the periodic BSR timer information) may be included in uplink shared channel configuration information (ul-SCH-Config) of MAC main configuration information (MAC-MainConfig) of an RRC message, in operation S615.

For example, event configuration information may be configured through different uplink shared channel configuration information for each small cell configured as an SCell, each small cell BS, or each small cell BS CC(s). Through the above, an independent operation from a PCell BS may be possible.

Alternatively, the event configuration information may be identical (for example, identical ul-SCH-Config) between the PCell (or PCell BS) and an SCell (or SCell BS).

Hereinafter, the operation of the UE for transmitting a buffer status report associated with a buffer status of a logical channel or a logical channel group will be described in detail.

A single MAC Protocol Data Unit (PDU) may include at most a single MAC buffer status report (BSR) control element.

Although uplink grant (UL grant) may hold all pending data to be transferred through a predetermined small cell configured as an SCell, a predetermined small cell BS, or predetermined small cell BS CCs, at a corresponding subframe, all triggered buffer status reports (BSRs) associated with logical channels to be transferred through the small cell configured as an SCell, the small cell BS, or the small cell BS CCs should be cancelled when the uplink grant is insufficient to additionally hold a sum of a buffer status report MAC control element and a subheader thereof.

When a buffer status report transferred through the predetermined small cell configured as an SCell, the predetermined small cell BS, or the predetermined small cell BS CCs, is included in a MAC PDU for transmission, all triggered buffer status reports transferred through the predetermined small cell configured as an SCell, the predetermined small cell BS, or the predetermined small cell BS CCs need to be cancelled.

A UE may perform independent buffer status reporting for each BS.

When the UE transmits a buffer status report by configuring a radio resource (DBR) through a small cell (e.g., configured as an SCell, a small cell BS, or CCs of the small cell BS), the UE may transmit a plurality of Regular/Periodic BSRs within a single Transmission Time Interval (TTI). Through a macro cell (e.g., configured as a PCell, a macro cell BS, or CCs of the macro cell BS), the UE may transmit at most a single Regular/Periodic BSR to the macro cell BS within a single TTI. That is, the UE may transmit at most a single Regular/Periodic BSR within a single TTI, with respect to the macro cell BS or the macro cell BS CCs.

With respect to each small cell (e.g., configured as an SCell, each small cell BS, or each small cell BS CC(s)), the UE may transmit at most a single Regular/Periodic BSR within a single TTI in a predetermined small cell BS. That is, through a small cell, a small cell BS, or CCs of the small cell BS, the UE may transmit at most a single Regular/Periodic BSR within a single TTI to the small cell BS. When the UE is requested to transmit a plurality of MAC PDUs within a single TTI, with respect to each small cell configured as an SCell, each small cell, or each small cell CC(s), the UE may include a padding BSR in any one of MAC PDUs, which do not include a Regular/Periodic BSR.

As another method, the UE transmits at most a single Regular/periodic BSR within a single Transmission Time Interval (TTI). In the case in which the UE transmits a buffer status report through a small cell configured as an SCell, a small cell BS, or CCs of the small cell BS, when the UE is requested to transmit a plurality of MAC PDUs within a single TTI, the UE may include a BSR of the small cell BS configured as an SCell in any one of MAC PDUs, which do not include a Regular/Periodic BSR with respect to a macro cell BS configured as a PCell.

As another method, when the UE configures a radio resource (DRB) through a small cell configured as an SCell, a small cell BS, or CCs of the small cell, and transmits a buffer status report, only a padding BSR may be used.

Figure 7:
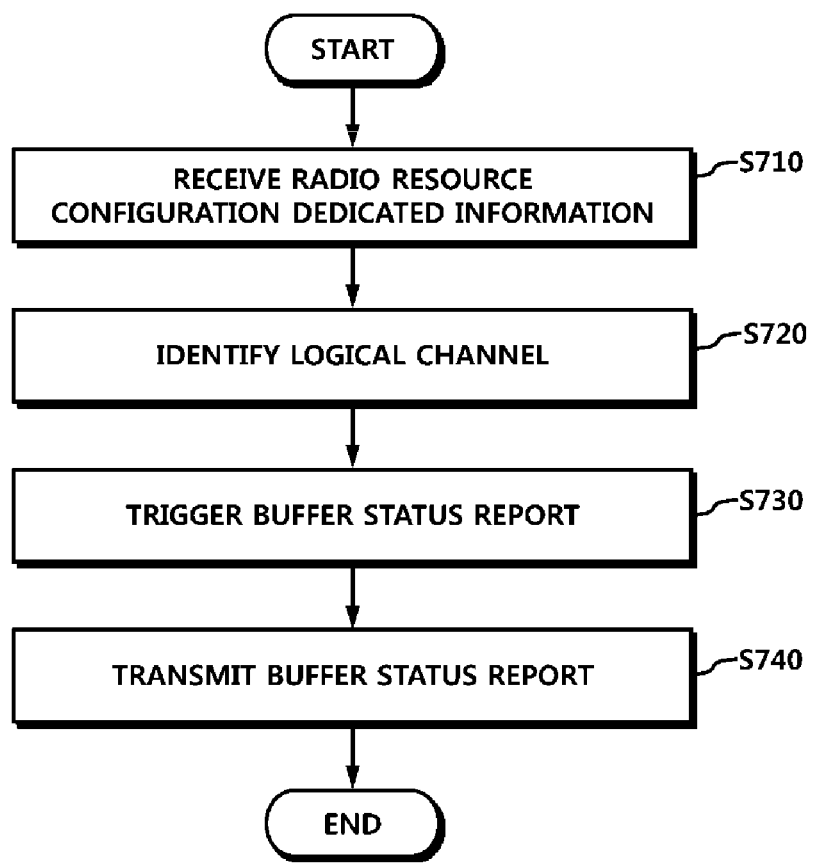
FIG. 7 is a flowchart illustrating operations of a UE according to another embodiment.

FIG. 7 is a flowchart illustrating operations of a UE according to another embodiment.

A UE according to an embodiment configures dual connectivity with a first BS and a second BS, and the UE configures a first bearer and a second bearer with each BS.

Subsequently, the UE transmits buffer status report information of a predetermined bearer, to the first BS or the second BS where the predetermined bearer belongs.

Also, referring to FIG. 7, as described above, the UE receives, from the first BS, radio resource configuration dedicated information including identification information used for identifying a logical channel, in operation S710. The radio resource configuration dedicated information may be included in an upper layer signaling (for example, an RRC message), or may be received through an upper layer signaling.

The UE may identify a predetermined logical channel that is transmitted through a small cell (e.g., configured as an SCell, a small cell BS, or CCs of the small cell BS,) based on the received identification information, in operation S720.

That is, the UE may identify logical channels to be transferred through a predetermined small cell configured as an SCell, a predetermined small cell BS, or predetermined small cell BS CCs, in a MAC layer, based on a cell identifier (for example, a PCI), an SCell index, an index used for the UE to identify a cell, or SCell BS index/indication information.

Alternatively, the UE may identify logical channels to be transferred through a predetermined small cell configured as an SCell, a predetermined small cell BS, or predetermined small cell BS CCs, in a MAC layer, by grouping the same into a predetermined Logical Channel Group (LCG).

As another method, the UE may identify logical channels to be transferred through a predetermined small cell configured as an SCell, a predetermined small cell BS, or predetermined small cell BS CCs, in a MAC layer, by assigning a predetermined priority value.

As another method, the UE may identify logical channels to be transferred through a predetermined small cell configured as an SCell, a predetermined small cell BS, or predetermined small cell BS CCs, in a MAC layer, by assigning a predetermined logical channel identifier.

The UE may distinguish a logical channel(s) or a logical channel group to be transferred through a small cell configured as an SCell, a small cell BS, or CCs of the small cell BS and a logical channel(s) or a logical channel group to be transferred through a macro cell configured as a PCell, a macro cell BS, or CCs of the macro cell BS, in a MAC layer, and may determine whether to trigger a buffer status report, in operation S730.

Event configuration information (for example, retransmission BSR timer and the periodic BSR timer information) may be included in uplink shared channel configuration information (ul-SCH-Config) of MAC main configuration information (MAC-MainConfig) of an RRC message.

Also, in the step of triggering a buffer status report, the UE may configure a retransmission BSR timer and a periodic BSR timer for triggering a buffer status report by identifying logical channels or a logical channel group to be mapped and transferred through the second BS or the second BS CCs, to be distinguished from a retransmission BSR timer and a periodic BSR timer for triggering a buffer status report by identifying logical channels or a logical channel group to be mapped and transferred through the first BS or the first BS CCs.

For example, event configuration information may be configured through different uplink shared channel configuration information for each small cell configured as an SCell, each small cell BS, or each small cell BS CC(s). Alternatively, the event configuration information may be identical (for example, identical ul-SCH-Config) between a PCell BS and an SCell BS.

When a buffer status report associated with a logical channel(s) or a logical channel group to be transferred through a small cell configured as an SCell, a small cell BS, or CCs of the small cell BS is triggered in a MAC layer, the UE may transmit a buffer status report to the SCell BS (the second BS), in operation S740.

Hereinafter, a buffer status report MAC PDU used when the UE transmits a buffer status report, will be described in detail.

Figure 8:
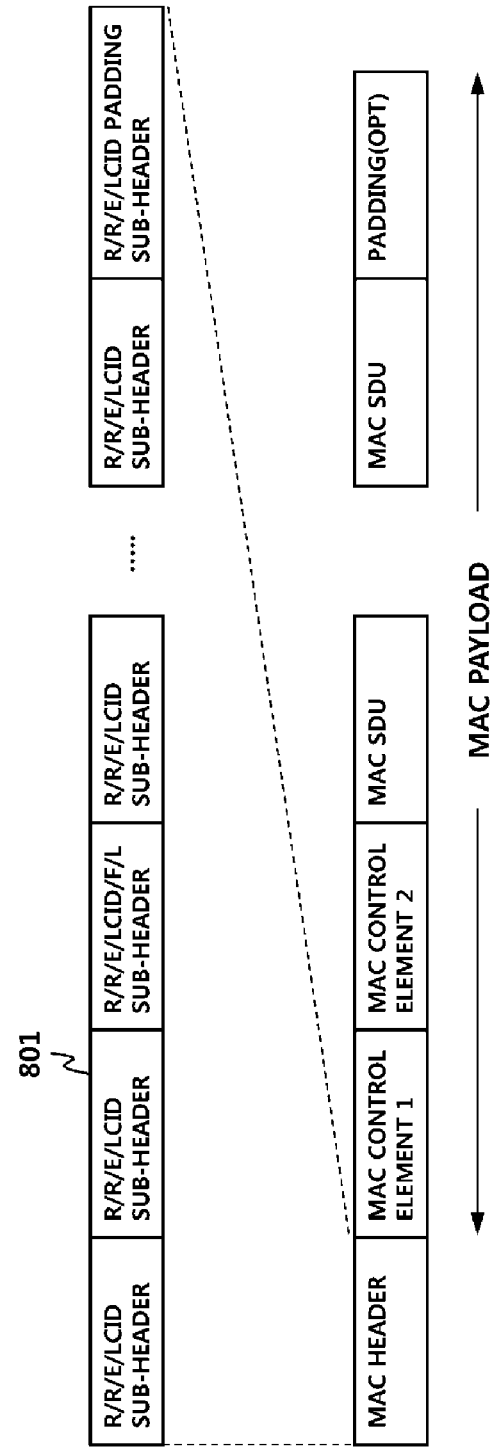
FIG. 8 is a diagram illustrating an example of a configuration of a MAC PDU to which at least one embodiment is applied.

FIG. 8 is a diagram exemplary illustrating configuration of a MAC PDU to which at least one embodiment is applied.

Referring to FIG. 8, a MAC PDU includes a single MAC header, no or one or more MAC Service Data Units (SDUs), no or one or more MAC control elements, and selectively includes a padding.

A MAC PDU header is formed of one or more MAC PDU subheaders 801. Each subheader 801 corresponds to a single MAC SDU, a single MAC control element, or a padding (A MAC PDU header consists of one or more MAC PDU subheaders; each subheader corresponds to either a MAC SDU, a MAC control element or padding).

A Logical Channel ID (LCID) field included in the MAC header may identify a logical channel instance of a corresponding MAC SUD, a corresponding MAC control element, or a type of padding.

For example, an LCID value associated with an UL-SCH may be configured as shown in Table 1.

TABLE 1

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG. 9 is a diagram illustrating a buffer status report MAC control element format to which at least one embodiment is applied.

Referring to FIG. 9, a format of a buffer status report MAC control elements is classified into a short BSR/truncated BSR format 900 and a long BSR format 910, 920, and 930.

The short BSR/truncated BSR format 900 is formed of a single logical channel group ID (LCG ID) field and a single corresponding buffer size field, as shown in FIG. 9. The LCG ID field may be a field for identifying a logical channel group of which buffer status is to be reported, and may have a length of 2 bits.

The long BSR format 910, 920, and 930 is formed of four buffer size fields corresponding to LCG IDs #0~#3, as shown in FIG. 9.

When a UE transmits a buffer status report according to an embodiment, the MAC control element format of FIG. 9 may be used.

When the UE transmits a buffer status report according to another embodiment, identification information may be included in a MAC sub-header or a buffer status report control element and transmitted.

Particularly, the case in which the identification information is included in the UE, will be described. When the UE transmits a buffer status report, the short BSR control element format and/or the long BSR control element format may include a cell identifier (for example, a PCI), an SCell index, an index for a UE to identify a cell, or SCell BS index/indication information.

As another method, the UE may include a cell identifier (for example, a PCI), an SCell index, an index for a UE to identify a cell, or SCell BS index/indication information in a MAC sub-header corresponding to a short BSR control element and/or a long BSR control element. The UE may transmit the same. For example, a reserved bit or format field, or a new field may be defined and used. Alternatively, a BSR for an SCell BS may be distinguished by defining a new value for an Logical Channel ID (LCID) field value of a MAC sub-header for a short BSR/truncated BSR/long BSR control element to be transmitted through an SCell, to be different from an LCID field value (short BSR: 11101, Truncated BSR: 11100, Long BSR: 11110) of a MAC sub-header for a short BSR/truncated BSR/long BSR control element to be transmitted through a PCell BS.

As another method, the UE may include information that may identify logical channels to be transferred through a predetermined small cell, a predetermined small cell BS, or predetermined small cell BS CCs, in a short BSR control element format and/or a long BSR control element format. For example, the included identification information may be at least one of a logical channel group, a predetermined logical channel identifier, and a predetermined priority value.

Hereinafter, a prioritization procedure used when the UE transmits uplink data will be described in detail.

A UE according to an embodiment may apply a prioritization procedure for each second BS (an SCell BS) or for each the SCell BS CCs. That is, the UE may apply a prioritization procedure when a MAC PDU is configured by identifying logical channels or a logical channel group to be transferred through the second BS (SCell BS) or the SCell BS CCs, in a MAC layer. For example, a method of the UE according to an embodiment may further include executing a prioritization procedure by identifying logical channels to be mapped and transferred through a first BS or CCs of the first BS, and executing a prioritization procedure by identifying logical channels to be mapped and transferred through a second BS or CCs of the second BS, after the operation of identifying the logical channels.

A Logical Channel Prioritization (LCP) procedure is applied when the UE executes a new transmission, and the LCP procedure may be used when a MAC PDU is configured (construction) by determining each logical channel to be included in a MAC PDU and a data quantity based on a type of MAC control element.

The UE may map logical channels to be transmitted through a small cell configured as an SCell, a small cell BS, or CCs of the small cell BS to transport channels (for example, Uplink Shared Channels (UL-SCHs)) to be transmitted through the small cell configured as an SCell, the small cell BS, or the CCs of the small cell BS, in a MAC layer.

Therefore, the UE according to an embodiment execute a logical channel prioritization procedure by identifying the logical channels associated with the small cell configured as an SCell, the small cell BS, or the CCs of the small cell BS, in a MAC layer.

An example of the logical channel prioritization procedure will be described in detail.

A UE may assign resources to logical channels that belong to a predetermined small cell configured as an SCell, a predetermined small cell BS, or predetermined small cell BS CCs, by identifying a small cell configured as an SCell, a small cell BS, or CCs of the small cell BS, according to the following order.

1) The UE may assign resources to all the logical channels that belong to a predetermined small cell configured as an SCell, a predetermined small cell BS, or predetermined small cell CCs (or that are to be transferred through a predetermined small cell configured as an SCell, a predetermined small cell BS, or predetermined small cell BS CCs) and that satisfy Bj>0, in a decreasing priority order.
2) The UE decreases Bj up to a total size of MAC SDUs serviced to a logical channel in step 1).
Bj is initialized to 0 when a related logical channel is set, and may increase by a PBR*TTI duration for each TTI.
3) When resources remain, all the logical channels that belong to the predetermined small cell configured as an SCell, the predetermined small cell BS, or the predetermined small cell CCs (or that are to be transferred through the predetermined small cell configured as an SCell, the predetermined small cell BS, or the predetermined small cell BS CCs) may be serviced in a strict decreasing priority order until data or uplink grant associated with a logical channel is exhausted.

In association with the Logical Channel Prioritization (LCP) procedure, the UE of the present embodiment may execute a prioritization procedure by identifying logical channels to be transmitted through a small cell configured as an SCell, a small cell BS, CCs of the small cell BS.

The prioritization procedure may be equally applied when the UE maps logical channels of a PCell BS to transport channels to be transferred through a macro cell configured as a PCell, a macro cell BS, or CCs of the macro cell BS.

Particularly, for example, the UE may map logical channels to be transmitted through a macro cell configured as a PCell, a macro cell BS, or CCs of the macro cell BS to transport channels (for example, Uplink Shared Channels (UL-SCHs)) to be transmitted through the macro cell configured as a PCell, the macro cell BS, or the CCs of the macro cell BS, in a MAC layer.

Therefore, the UE according to an embodiment may execute a logical channel prioritization procedure by identifying logical channels associated with a macro cell configured as a PCell, a macro cell BS, CCs of the macro cell BS.

An example of the logical channel prioritization procedure will be described in detail.

A UE may assign resources to logical channels that belong to a macro cell configured as a PCell, a macro cell BS, or CCs of the macro cell BS, to the macro cell configured as a PCell, the macro cell BS, or CCs of the macro cell BS, according to the following order.

1) The UE may assign resources to all the logical channels that belong to the macro cell configured as a PCell, the macro cell BS, or the CCs of the macro cell (or that are to be transferred through the macro cell configured as a PCell, the macro cell BS, or the CCs of the macro cell BS) and that satisfy Bj>0, in a decreasing priority order.
2) The UE decreases Bj up to a total size of MAC SDUs serviced to a logical channel in step 1).
Bj is initialized to 0 when a related logical channel is set, and may increase by a PBR*TTI duration for each TTI.

3) When resources remain, all the logical channels that belong to the macro cell configured as a PCell, the macro cell BS, or the CCs of the macro cell (or that are to be transferred through the macro cell configured as a PCell, the macro cell BS, or the CCs of the macro cell BS) may be serviced in a strict decreasing priority order until data or uplink grant associated with a logical channel is exhausted.

In association with the Logical Channel Prioritization (LCP) procedure, the UE of the present invention executes a prioritization procedure by identifying logical channels transmitted through a macro cell configured as a PCell, a macro cell BS, CCs of the macro cell BS.

The buffer status report transmitting method of the present invention that has been described with reference to FIGS. 5 to 9, will be described again from the perspective of operations of a BS.

Figure 10:
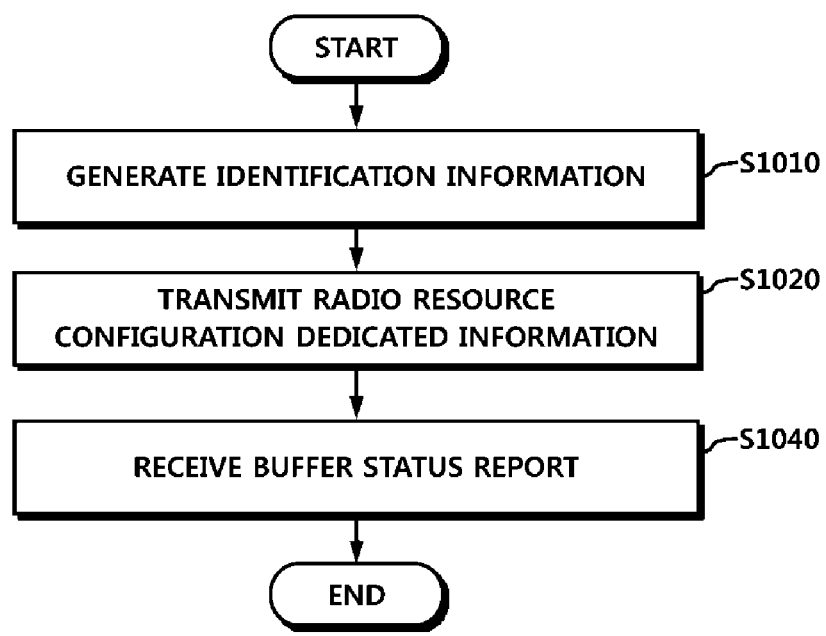
FIG. 10 is a flowchart illustrating operations of a BS according to another embodiment.

FIG. 10 is a flowchart illustrating operations of a BS according to another embodiment.

In accordance with at least one embodiment, a method may be provided for a first BS to control buffer status reporting of a UE. The method includes generating identification information for distinguishing a radio bearer to be transferred through the first BS or Component Carriers (CCs) of the first BS and a radio bearer to be transferred through a second BS or CCs of the second BS, transmitting an RRC reconfiguration message including the identification information to the UE, and receiving a buffer status report associated with logical channels or a logical channel group to be mapped and transferred through the first BS or the CCs of the first BS, which is distinguished from a buffer status report associated with logical channels or logical channel group to be mapped or transferred through the second BS or the CCs of the second BS.

For example, the first BS may configure dual connectivity with the UE, together with the second BS that is connected through a non-ideal backhaul. Also, the first BS may provide a bearer to the UE, and the bearer provided to the UE is distinguished from a bearer that the second BS provides to the UE. Subsequently, in the process in which the first BS receives a buffer status report from the UE, the first BS may receive a buffer status report associated with logical channels or a logical channel group to be mapped and transferred through the first BS or CCs of the first BS. In the case of the second BS, the second BS may receive a buffer status report associated with logical channels or a logical channel group to be mapped and transferred through the second BS or CCs of the second BS.

Also, in the step of generating identification information according to another embodiment, the first BS may configure a retransmission BSR timer and a periodic BSR timer for triggering a buffer status report by identifying logical channels or a logical channel group to be mapped and transferred through the second BS or the second BS CCs, to be distinguished from a retransmission BSR timer and a periodic BSR timer for triggering a buffer status report by identifying logical channels or a logical channel group to be mapped and transferred through the first BS or the first BS CCs.

Referring to FIG. 10, the first BS generates identification information for distinguishing a radio bearer to be transferred through the first BS or CCs of the first BS and a radio bearer to be transferred through the second BS or CCs of the second BS, in operation S1010.

The generated identification information includes at least one piece of information from among a cell identifier, a PCell index, an SCell index, PCell BS indication information, and SCell BS indication information, and may be included in radio bearer addition/modification information or logical channel configuration information.

Alternatively, a field designated value or a field extension information used for distinguishing a radio bearer to be transferred through the first BS or CCs of the first BS and a radio bearer to be transferred through the second BS or CCs of the second BS, may be included in a field included in one of logical channel group information, priority information, and logical channel identification information.

The first BS may include the generated identification information in radio resource configuration dedicated information and transmit the same to the UE, in operation S1020. As described above, the identification information may be transmitted by being included in radio bearer addition/modification information or logical channel configuration information, or may be transmitted by being included in each field of the logical channel configuration information.

The radio resource configuration dedicated information may be transmitted to the UE through an upper layer signaling (for example, an RRC reconfiguration message).

The first BS may receive a buffer status report from the UE, and in the present embodiment, the first BS (a PCell BS) receives a buffer status report associated with logical channels or a logical channel group to be mapped and transferred through the first BS or CCs of the first BS, which is distinguished from a buffer status report associated with logical channels or a logical channel group to be mapped and transferred through the second BS or CCs of the second BS, in operation S1040.

A method of the first BS according to another embodiment may further include generating buffer status reporting event configuration information associated with logical channels or a logical channel group to be mapped and transferred through the second BS or CCs of the second BS, and transmitting uplink shared channel configuration information including the event configuration information, before receiving a buffer status report from the UE. As described above, the event configuration information (for example, retransmission BSR timer and the periodic BSR timer information) may be transmitted by being included in uplink shared channel configuration information (ul-SCH-Config) of MAC main configuration information (MAC-MainConfig) of an RRC message. Also, the event configuration information may be transmitted to the UE together with the radio resource configuration dedicated information.

For example, event configuration information may be configured through different uplink shared channel configuration information for each small cell configured as an SCell, each small cell BS, or each small cell BS CC(s). Alternatively, the event configuration information may be identical (for example, identical ul-SCH-Config) between the PCell (or PCell BS) and an SCell (or SCell BS).

Figure 11:
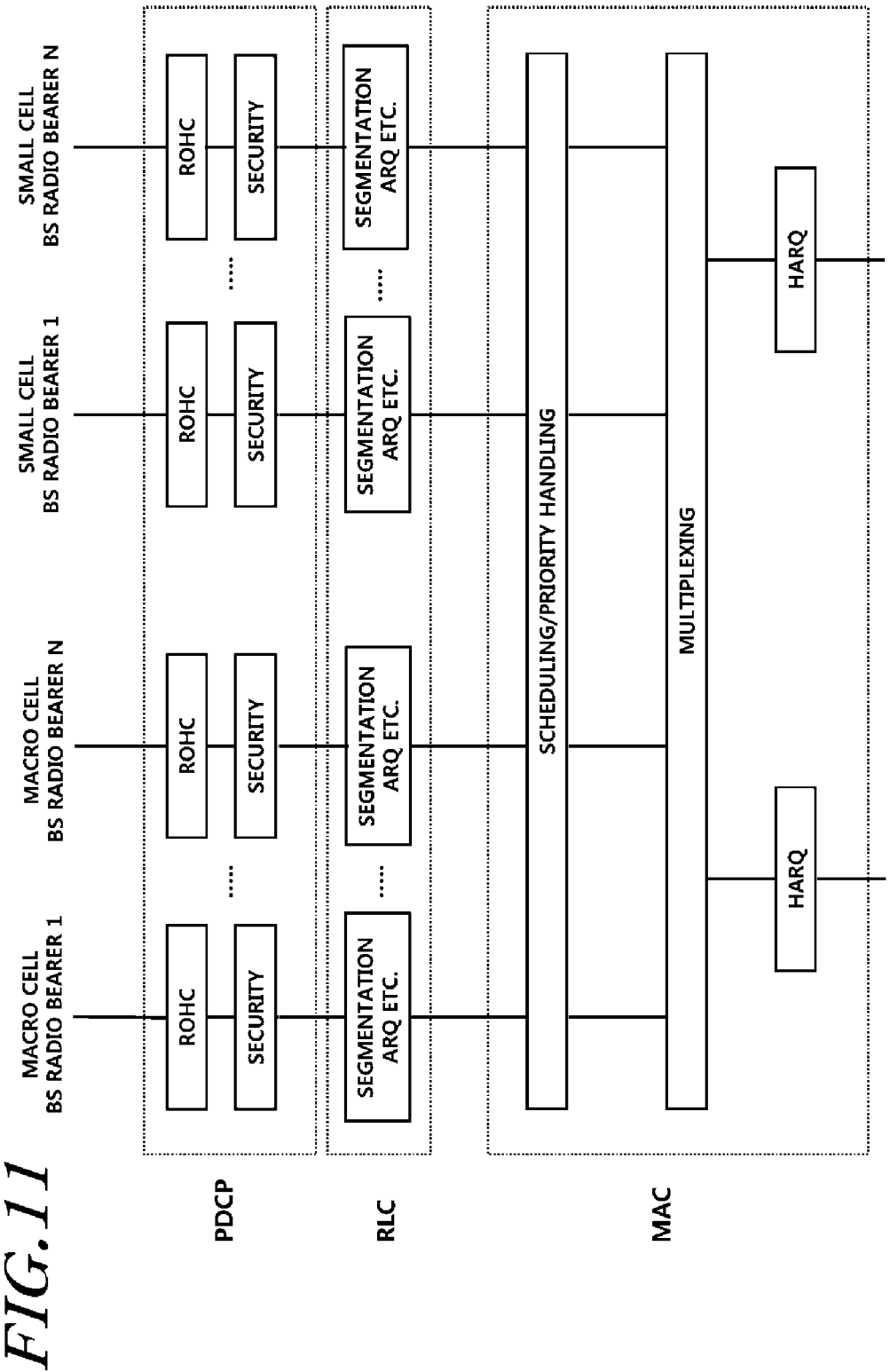
FIG. 11 is a diagram illustrating an example of a layer structure of a UE according to another embodiment.

FIG. 11 is a diagram illustrating an example of a layer structure of a UE according to another embodiment.

FIG. 11 illustrates a Layer 2 protocol structure of a UE according to an embodiment. A PDCP entity of a first BS (macro cell BS) to be transferred through a macro cell BS based on a radio bearer unit and a PDCP entity of a second BS (small cell BS) to be transferred through the second BS (small cell BS) are distinguished from each other.

Figure 12:
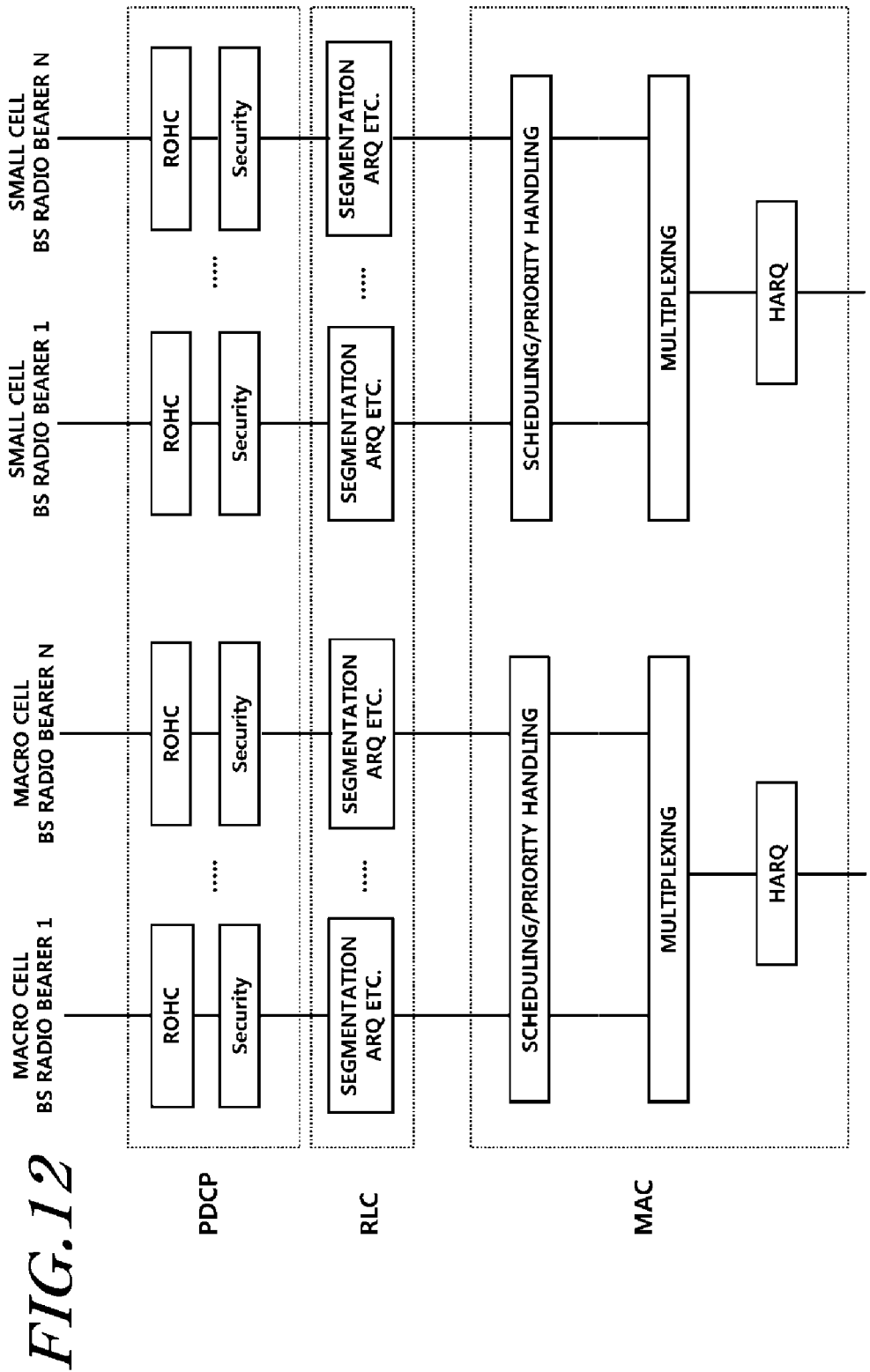
FIG. 12 is a diagram illustrating another example of a layer structure of a UE according to another embodiment.

FIG. 12 is a diagram illustrating another example of a layer structure of a UE according to another embodiment.

FIG. 12 illustrates a Layer 2 protocol structure of a UE embodied as another embodiment. A MAC layer entity for a first BS (macro cell BS) and a MAC layer entity for a second BS (small cell BS) are separated in a MAC layer.

That is, the UE according to the present embodiment may have a Scheduling/Priority Handling entity, a Multiplexing entity, and a HARQ entity for the first BS (macro cell BS) and a Scheduling/Priority Handling entity, a Multiplexing entity, and a HARQ entity for the small cell BS, separately.

The MAC layer entity for the first BS may map logical channels to be transferred through the first BS or CCs of the first BS to transport channels to be transferred through the first BS or CCs of the first BS. The MAC layer entity for the second BS may map logical channels to be transferred through the second BS or CCs of the second BS to transport channels to be transferred through the second BS or CCs of the second BS. As described in FIG. 11 and FIG. 12, according to a buffer status report transmitting method of the present embodiment, the UE may perform buffer status reporting and a logical channel prioritization procedure, in association with uplink data to be transferred through the first BS or CCs of the first BS, separately from buffer status reporting and a logical channel prioritization procedure in association with uplink data to be transferred through the second BS or CCs of the second BS.

Figure 13:
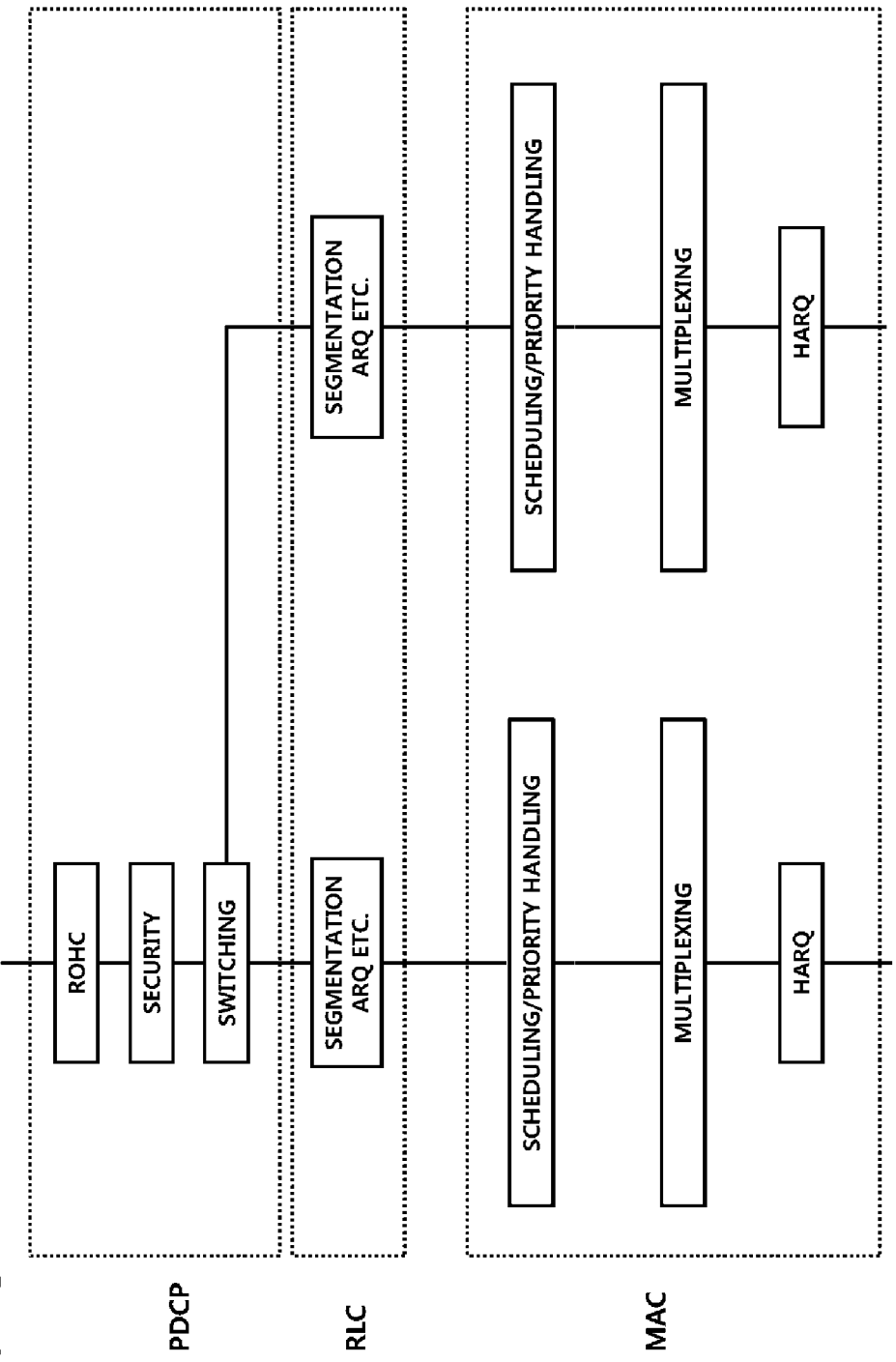
FIG. 13 is a diagram illustrating another example of a layer structure of a UE according to another embodiment.

FIG. 13 is a diagram illustrating another example of a layer structure of a UE according to another embodiment.

Particularly, FIG. 13 illustrates another example of a Layer 2 structure of a UE, which illustrates a Layer 2 protocol structure of the UE in detail, which is embodied in a different manner from FIG. 11 and FIG. 12.

Referring to FIG. 13, to enable a single radio bearer to transmit user plane data through a first BS and a second BS, a MAC layer (entity) for the first BS and a MAC layer (entity) for the second BS divided from a MAC layer may be provided. Also, an RLC layer (entity) for the first BS and an RLC layer (entity) for the second BS divided from an RLC layer may be provided.

That is, the first BS may have a scheduling/priority handling entity, a multiplexing entity, a HARQ entity, and an RLC entity, and the second BS may have the above described entities.

A PDCP layer includes entities for separating and switching data into the first BS RLC layer and the second BS RLC layer.

As described in FIG. 13, according to the buffer status report transmitting method of the present embodiment, the UE may transmit, to the second BS (small cell BS), a buffer status report associated with a radio bearer configured through the first BS (macro cell BS) and the second BS (small cell BS).

Figure 14:
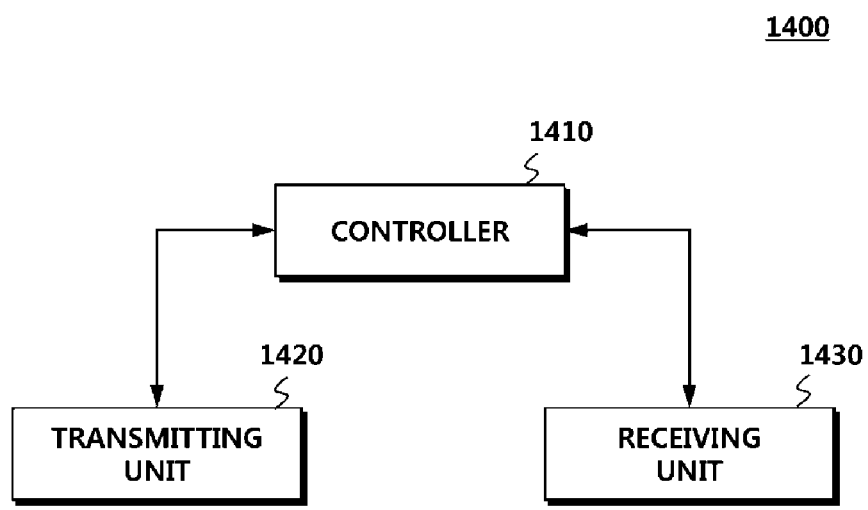
FIG. 14 is a diagram illustrating a configuration of a BS according to another embodiment.

FIG. 14 is a diagram illustrating configuration of a BS according to another embodiment Referring to FIG. 14, a first Base Station (BS) 1400 according to another embodiment includes a controller 1410, a transmitting unit 1420, and a receiving unit 1430.

The controller 1410 controls general operations of the first BS in association with a process in which a UE distinctively transmits, to the first BS, a buffer status report associated with logical channels or a logical channel group to be mapped and transferred through the first BS or CCs of the first BS, and transmits, to a second BS, a buffer status report associated with logical channels or logical channel group to be mapped and transferred through the second BS or CCs of the second BS.

For example, the controller 1410 may control general operations of the first BS, required for configuring dual connectivity with a UE together with the second BS, and for configuring a radio bearer.

The controller 1410 may generate identification information for distinguishing a radio bearer to be transferred through the first BS or CCs of the first BS and a radio bearer to be transferred through the second BS or CCs of the second BS.

Also, the controller 1410 may generate identification information for distinguishing a radio bearer to be transferred through the first BS or CCs of the first BS and a radio bearer to be transferred through the second BS or CCs of the second BS, or may generate the second BS (SCell BS) configuration information or event configuration information. Alternatively, the controller 1410 may control transmission/reception of the transmitting unit 1420 and the receiving unit 1430.

The transmitting unit 1420 and the receiving unit 1430 may be used for transmitting and receiving a signal, a message, or data required for implementing the above described present disclosure, to/from a UE.

For example, the transmitting unit 1420 may transmit radio resource configuration dedicated information including identification information, or may transmit uplink shared channel configuration information including event configuration information.

Also, the receiving unit 1430 may receive a buffer status report from the UE, and the buffer status report is a buffer status report associated with logical channels or a logical channel group to be mapped and transferred through the first BS or the CCs of the first BS, which is distinguished from a buffer status report associated with logical channels or a logical channel group to be mapped and transferred through the second BS or CCs of the second BS.

Figure 15:
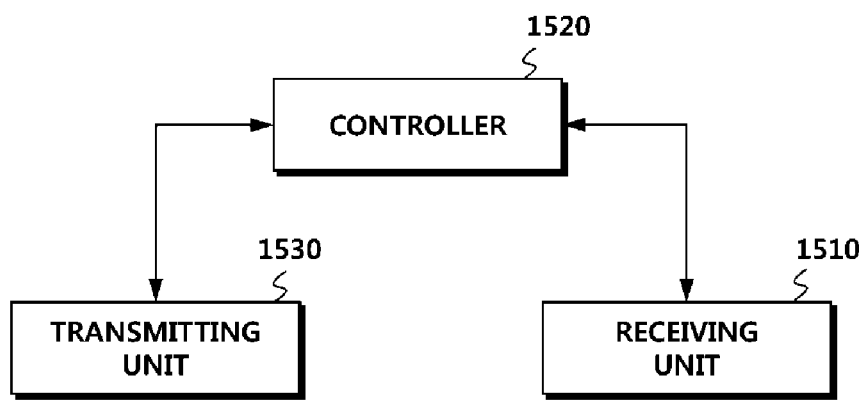
FIG. 15 is a diagram illustrating a configuration of a UE according to another embodiment

FIG. 15 is a diagram illustrating configuration of a UE according to another embodiment.

Referring to FIG. 15, a UE 1500 according to another embodiment includes a receiving unit 1510, a controller 1520, and a transmitting unit 1530.

The controller 1520 controls general operations of the UE 1500 in association with a process in which the UE 1500 distinctively transmits, to a first BS, a buffer status report associated with logical channels or a logical channel group to be mapped and transferred through the first BS or CCs of the first BS, and transmits, to a second BS, a buffer status report associated with logical channels or logical channel group to be mapped and transferred through the second BS or CCs of the second BS.

For example, the controller 1520 may control general operations of the UE 1500, required for configuring dual connectivity with the first BS and the second BS, and for configuring a radio bearer.

Also, the controller 1520 may control general operations in association with distinguishing logical channels to be mapped and transferred through the first BS or CCs of the first BS and logical channels to be mapped and transferred through the second BS or CCs of the second BS in a MAC layer, and triggering a buffer status report by distinguishing a buffer status of the logical channels or a logical channel group to be mapped and transferred through the first BS or the CCs of the first BS and a buffer status of the logical channels or a logical channel group to be mapped and transferred through the second BS or the CCs of the second BS.

Also, the controller 1520 may perform a prioritization procedure by identifying logical channels to be mapped and transferred through the first BS and the CCs of the first BS, and may perform a prioritization procedure by identifying logical channels to be mapped and transferred through the second BS or the CCs of the second BS.

Also, the controller 1520 may configure a MAC entity for the logical channels to be mapped and transferred through the first BS or the CCs of the first BS, to be distinguished from a MAC entity for the logical channels to be mapped and transferred through the second BS or the CCs of the second BS.

Also, the controller 1520 may configure a retransmission BSR timer and a periodic BSR timer for triggering a buffer status report by identifying logical channels or a logical channel group to be mapped and transferred through the second BS or the second BS CCs, to be distinguished from a retransmission BSR timer and a periodic BSR timer for triggering a buffer status report by identifying logical channels or a logical channel group to be mapped and transferred through the first BS or the first BS CCs.

The receiving unit 1510 may receive, from a BS, downlink control information, downlink data, and a message, through a corresponding channel.

For example, the receiving unit 1510 may receive, from the first BS, radio resource configuration dedicated information including identification information that distinguishes a radio bearer to be transferred through the first BS and a radio bearer to be transferred through the second BS. For example, the identification information may be included in and received through an RRC reconfiguration message.

Also, the receiving unit 1510 may receive uplink shared channel configuration information including event configuration information for triggering a buffer status report by identifying the second BS or CCs of the second BS.

The transmitting unit 1530 transmits, to a BS, uplink control information, uplink data, and a message, through a corresponding channel.

For example, the transmitting unit 1530 transmits, to the first BS, a buffer status report associated with logical channels or a logical channel group to be mapped and transferred through the first BS or CCs of the first BS, and transmits, to the second BS, a buffer status report associated with logical channels or logical channel group to be mapped and transferred through the second BS or CCs of the second BS.

As described above, according to the present embodiments, a UE may execute buffer status reporting and a logical channel prioritization procedure for each small cell configured as an SCell, each small cell BS, or each small cell CC when user plane data is transferred through a small cell under a control of a macro cell (or through cooperation between a macro cell and a small cell) in an environment where the macro cell and the small cell are connected through a non-ideal backhaul and are configured by individual BSs in a mobile communication network.

Also, according to the present embodiments, a UE identifies a buffer status report associated with a data radio bearer associated with each BS and transmits the buffer status report to a corresponding BS.

Although a preferred embodiment has been described for illustrative purposes, those skilled in the art will appreciate that various modifications, additions, and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:
1. A method for transferring a buffer status report by a User Equipment (UE) that configures dual connectivity with a first Base Station (BS) and a second BS, which are connected through a non-ideal backhaul, the method comprising:

receiving, from the first BS, an RRC reconfiguration message including identification information for distinguishing a radio bearer to be transferred through the first BS or Component Carriers (CCs) of the first BS and a radio bearer to be transferred through the second BS or CCs of the second BS, wherein the identification information includes BS indication information for identifying whether a specific radio bearer is associated with the first BS or the second BS;

distinguishing logical channels to be mapped and transferred through the first BS or the CCs of the first BS and logical channels to be mapped and transferred through the second BS or the CCs of the second BS, in a medium access control (MAC) layer;

independently triggering a buffer status report for each of the first BS and second BS by distinguishing a buffer status of the logical channels or a logical channel group to be mapped and transferred through the first BS or the CCs of the first BS, and a buffer status of the logical channels or a logical channel group to be mapped and transferred through the second BS or the CCs of the second BS; and transmitting, to the first BS, a first buffer status report associated with the logical channels or the logical group to be mapped and transferred through the first BS or the CCs of the first BS, and transmitting, to the second BS, a second buffer status report associated with the logical channels or the logical group to be mapped and transferred through the second BS or the CCs of the second BS, wherein the transmitting of the first buffer status report to the first BS and the transmitting of the second buffer status report to the second BS are independently performed from each other, wherein the identification information is included in radio bearer addition/modification information or logical channel configuration information, and wherein the first buffer status report comprises a regular BSR when uplink data is available for at least one logical channel associated with the first BS, and wherein the second buffer status report comprises a regular BSR when uplink data is available for at least one logical channel associated with the second BS, and wherein the transmitting of the first buffer status report and the transmitting of the second buffer status report are cancelled when an uplink grant is insufficient to hold an associated buffer status report MAC control element, wherein the radio bearer addition/modification information is included radio resource configuration dedicated information, wherein the radio bearer addition/modification information includes an EPS bearer identifier, drb-Identity, pdcp-Config, rlc-Config, logical Channel Identity, and logical channel configuration information, wherein the radio bearer addition/modification information is generated through a procedure through an X2 interface between the first BS and the second BS, and wherein the CCs of the second BS is activated/deactivated by MAC control element (MAC CE) for indicating activation/deactivation of the CCs of the second BS, wherein when the MAC CE for activating a specific CC of the second BS is received within a Transmission Time Interval (TTI), the specific CC of the second BS is activated within the TTI and a deactivation timer associated the specific CC of the second BS is started, when the deactivation timer configured by an upper layer signaling expires, the specific CC of the second BS is deactivated.

2. The method as claimed in claim 1, wherein, after distinguishing the logical channels, the method further comprises:

executing a prioritization procedure by identifying the logical channels to be mapped and transferred through the first BS or the CCs of the first BS, and executing a prioritization procedure by identifying the logical channels to be mapped and transferred through the second BS or the CCs of the second BS.

3. The method as claimed in claim 1, wherein the distinguishing the logical channels comprises:

configuring a MAC entity for the logical channels to be mapped and transferred through the first BS or the CCs of the first BS, to be distinguished from a MAC entity for logical channels to be mapped and transferred through the second BS or the CCs of the second BS.

4. The method as claimed in claim 1, wherein the identification information includes at least one piece of information from among a cell identifier, a primary cell index, a secondary cell index, primary cell BS indication information, and secondary cell BS indication information.

5. The method as claimed in claim 1, wherein the identification information includes a field designated value or field extension information for distinguishing a radio bearer to be transferred through the first BS or the CCs of the first BS and a radio bearer to be transferred through the second BS or the CCs of the second BS, and the field designated value or the field extension information is included in a field included in one of logical channel group information, priority information, and logical channel identifier information.

6. The method as claimed in claim 1, wherein the triggering the buffer status report comprises:

configuring a retransmission buffer status report (BSR) timer and a periodic BSR timer for triggering the second buffer status report by identifying the logical channels or the logical channel group to be mapped and transferred through the second BS or the CCs of the second BS, to be distinguished from a retransmission BSR timer and a periodic BSR timer for triggering the first buffer status report by identifying the logical channels or the logical channel group to be mapped and transferred through the first BS or the CCs of the first BS.

7. A method for a first Base Station (BS) to control buffer status reporting of a User Equipment (UE), the method comprising:

generating identification information for distinguishing a radio bearer to be transferred through the first BS or Component Carriers (CCs) of the first BS and a radio bearer to be transferred through a second BS or CCs of the second BS, wherein the identification information includes BS indication information for identifying whether a specific radio bearer is associated with the first BS or the second BS;

transmitting a radio resource control (RRC) reconfiguration message including the identification information to the UE; and receiving, by the first BS, a first buffer status report associated with logical channels or a logical channel group to be mapped and transferred through the first BS or the CCs of the first BS, which is distinguished from a second buffer status report, to be received by the second BS, associated with logical channels or a logical channel group to be mapped or transferred through the second BS or the CCs of the second BS, wherein the receiving of the first buffer status report by the first BS and the receiving of the second buffer status report by the second BS are independently performed from each other, wherein the identification information is included in radio bearer addition/modification information or logical channel configuration information, and wherein the first buffer status report comprises a regular BSR when uplink data is available for at least one logical channel associated with the first BS, and wherein the second buffer status report comprises a regular BSR when uplink data is available for at least one logical channel associated with the second BS, and wherein the transmitting of the first buffer status report and the transmitting of the second buffer status report are cancelled when an uplink grant is insufficient to hold an associated buffer status report MAC control element, wherein the radio bearer addition/modification information is included radio resource configuration dedicated information, wherein the radio bearer addition/modification information includes an EPS bearer identifier, drb-Identity, pdcp-Config, rlc-Config, logical Channel Identity, and logical channel configuration information, wherein the radio bearer addition/modification information is generated through a procedure through an X2 interface between the first BS and the second BS, and wherein the CCs of the second BS is activated/deactivated by MAC control element (MAC CE) for indicating activation/deactivation of the CCs of the second BS, wherein when the UE receive the MAC CE for activating a specific CC of the second BS within a Transmission Time Interval (TTI), the specific CC of the second BS is activated within the TTI and a deactivation timer associated the specific CC of the second BS is started, when the deactivation timer configured by an upper layer signaling expires, the specific CC of the second BS is deactivated.

8. The method as claimed in claim 7, wherein the identification information includes at least one piece of information from among a cell identifier, a primary cell index, a secondary cell index, primary cell BS indication information, and secondary cell BS identification information.

9. The method as claimed in claim 7, wherein the identification information includes a field designated value or field extension information for distinguishing a radio bearer to be transferred through the first BS or the CCs of the first BS and a radio bearer to be transferred through the second BS or the CCs of the second BS, and the field designated value or the field extension information is included in a field included in one of logical channel group information, priority information, and logical channel identifier information.

10. The method as claimed in claim 7, wherein generating the identification information comprises:

configuring a retransmission BSR timer and a periodic BSR timer for triggering the second buffer status report by identifying the logical channels or the logical channel group to be mapped and transferred through the second BS or the CCs of the second BS, to be distinguished from a retransmission BSR timer and a periodic BSR timer for triggering the first buffer status report by identifying the logical channels or the logical channel group to be mapped and transferred through the first BS or the CCs of the first BS.

11. A User Equipment (UE) that configures dual connectivity with a first Base Station (BS) and a second BS, which are connected through a non-ideal backhaul, and transmits a buffer status report, the UE comprising:
- a receiver configured to receive, from the first BS, an RRC reconfiguration message including identification information for distinguishing a radio bearer to be transferred through the first BS or Component Carriers (CCs) of the first BS, and a radio bearer to be transferred through the second BS or CCs of the second BS, wherein the identification information includes BS indication information for identifying whether a specific radio bearer is associated with the first BS or the second BS;
- a controller configured to distinguish logical channels to be mapped and transferred through the first BS or the CCs of the first BS and logical channels to be mapped and transferred through the second BS or the CCs of the second BS, in a MAC layer, and to independently trigger a buffer status report for each of the first BS and second BS by distinguishing a buffer status of the logical channels or a logical channel group to be mapped and transferred through the first BS or the CCs of the first BS and a buffer status of the logical channels or a logical channel group to be mapped and transferred through the second BS or the CCs of the second BS; and
- a transmitter configured to transmit, to the first BS, a first buffer status report associated with the logical channels or the logical channel group to be mapped or transferred through the first BS or the CCs of the first BS, and to transmit, to the second BS, a second buffer status report associated with the logical channels or the logical channel group to be mapped or transferred through the second BS or the CCs of the second BS, wherein the transmitting of the first buffer status report to the first BS and the transmitting of the second buffer status report to the second BS are independently performed from each other,
wherein the identification information is included in radio bearer addition/modification information or logical channel configuration information, and
wherein the first buffer status report comprises a regular BSR when uplink data is available for at least one logical channel associated with the first BS, and wherein the second buffer status report comprises a regular BSR when uplink data is available for at least one logical channel associated with the second BS, and
wherein the transmitting of the first buffer status report and the transmitting of the second buffer status report are cancelled when an uplink grant is insufficient to hold an associated buffer status report MAC control element,
wherein the radio bearer addition/modification information is included radio resource configuration dedicated information,
wherein the radio bearer addition/modification information includes an EPS bearer identifier, drb-Identity, pdcp-Config, rlc-Config, logical Channel Identity, and logical channel configuration information,
wherein the radio bearer addition/modification information is generated through a procedure through an X2 interface between the first BS and the second BS, and
wherein the CCs of the second BS is activated/deactivated by MAC control element (MAC CE) for indicating activation/deactivation of the CCs of the second BS,
wherein when the MAC CE for activating a specific CC of the second BS is received within a Transmission Time Interval (TTI), the specific CC of the second BS is activated within the TTI and a deactivation timer associated the specific CC of the second BS is started,
when the deactivation timer configured by an upper layer signaling expires, the specific CC of the second BS is deactivated.

12. The UE as claimed in claim 11, wherein the controller is configured to execute a prioritization procedure by identifying the logical channels to be mapped and transferred through the first BS or the CCs of the first BS, and the controller is configured to execute a prioritization procedure by identifying the logical channels to be mapped and transferred through the second BS or the CCs of the second BS.

13. The UE as claimed in claim 11, wherein the controller is configured to configure a MAC entity for the logical channels to be mapped and transferred through the first BS or the CCs of the first BS, to be distinguished from a MAC entity for logical channels to be mapped and transferred through the second BS or the CCs of the second BS.

14. The UE as claimed in claim 11, wherein the identification information includes at least one piece of information from among a cell identifier, a primary cell index, a secondary cell index, primary cell base station indication information, and secondary cell base station indication information.

15. The UE as claimed in claim 11, wherein the identification information includes a field designated value or field extension information for distinguishing a radio bearer to be transferred through the first BS or the CCs of the first BS and a radio bearer to be transferred through the second BS or the CCs of the second BS, and the field designated value or the field extension information is included in a field included in one of logical channel group information, priority information, and logical channel identifier information.

16. The UE as claimed in claim 11, wherein the controller configures a retransmission BSR timer and a periodic BSR timer for triggering the second buffer status report by identifying the logical channels or logical channel group to be mapped and transferred through the second BS or the CCs of the second BS, to be distinguished from a retransmission BSR timer and a periodic BSR timer for triggering the first buffer status report by identifying the logical channels or logical channel group to be mapped and transferred through the first BS or the CCs of the first BS.

* * * * *